United States Patent
Kitada

(10) Patent No.: US 7,855,796 B2
(45) Date of Patent: Dec. 21, 2010

(54) PRINT JOB DISTRIBUTING AND HOLDING SYSTEM, PRINTING SYSTEM, PRINT JOB HOLDING APPARATUS, PRINTER, PRINT JOB HOLDING APPARATUS CONTROL PROGRAM, PRINTER CONTROL PROGRAM, PRINT JOB HOLDING APPARATUS CONTROL METHOD, AND PRINTER CONTROL METHOD

(75) Inventor: Naruhide Kitada, Nagano-ken (JP)

(73) Assignee: Seiko Epson Corporation (JP)

( * ) Notice: Subject to any disclaimer, the term of this patent is extended or adjusted under 35 U.S.C. 154(b) by 1300 days.

(21) Appl. No.: 11/396,254

(22) Filed: Mar. 31, 2006

(65) Prior Publication Data

US 2006/0239736 A1 Oct. 26, 2006

(30) Foreign Application Priority Data

Mar. 31, 2005 (JP) ............................. 2005-104978
Dec. 19, 2005 (JP) ............................. 2005-364433

(51) Int. Cl.
*G06F 3/12* (2006.01)

(52) U.S. Cl. ...................................... 358/1.15; 400/62

(58) Field of Classification Search .................. 358/1.1, 358/1.15, 1.9, 1.14; 400/62
See application file for complete search history.

(56) References Cited

U.S. PATENT DOCUMENTS

| 2002/0131593 A1* | 9/2002 | Parry ............................. 380/51 |
| 2005/0024672 A1* | 2/2005 | Guster et al. ................ 358/1.14 |
| 2005/0094184 A1* | 5/2005 | Suyehira ..................... 358/1.14 |

FOREIGN PATENT DOCUMENTS

| JP | 08-063309 | 3/1996 |
| JP | 10-193750 | 7/1998 |

* cited by examiner

*Primary Examiner*—King Y Poon
*Assistant Examiner*—Iriana Cruz
(74) *Attorney, Agent, or Firm*—Harness, Dickey & Pierce, P.L.C.

(57) ABSTRACT

A print job distributing and holding system. The system is capable of distributing and holding plural print jobs where several printers are connected via a network.

19 Claims, 17 Drawing Sheets

FIG. 13A

PRINT JOB ATTRIBUTE MANAGEMENT TABLE (IN PRINTER A)

| RECEPTION NUMBER IN PRINTER | ATTRIBUTE ITEM | ATTRIBUTE VALUE |
|---|---|---|
| 98 | PRINTING PERSON | zzzz |
| 98 | SHEET SIZE | A3 |
| 99 | PRINTING PERSON | xxxx |
| 99 | SHEET SIZE | A4 |
| 100 | PRINTING PERSON | yyyy |
| 100 | SHEET SIZE | A4 |
| 100 | DISTRIBUTED STORAGE DESTINATION | PRINTER B, PRINTER C, PRINTER D |

FIG. 13B

DATA OF JOB

| RECEPTION NUMBER IN PRINTER | PRINT DATA AND DISTRIBUTED DATA |
|---|---|
| 98 | xxxxxxx··· |
| 99 | xxxxxxx··· |
| 100 | xxxxxxx··· |

OPERATION STATE INFORMATION TABLE

| ENTRUSTED PRINTER CANDIDATE | NUMBER OF TIMES OF CHECK | NUMBER OF TIMES OF VALID RESPONSE ACQUISITION |
|---|---|---|
| PRINTER B | 10 | 9 |
| PRINTER C | 10 | 10 |
| PRINTER D | 10 | 9 |
| PRINTER E | 10 | 5 |

FIG.14

PRINT JOB ATTRIBUTE MANAGEMENT TABLE (IN PRINTER B)

| RECEPTION NUMBER IN PRINTER | ATTRIBUTE ITEM | ATTRIBUTE VALUE |
|---|---|---|
| 75 | PRINTING PERSON | yyyy |
| 75 | SHEET SIZE | A4 |
| 75 | DISTRIBUTED STORAGE SOURCE | PRINTER A |
| 75 | HOLDING TERM | 2004/1/18 18:00 |
| 75 | STORAGE SOURCE RECEPTION NUMBER | 100 |

| MODEL | HDD1 |
|---|---|
| STORAGE METHOD | FAT |
| CORRESPONDING ALGORITHM | DES |
| JOB APPARATUS SAFETY | LEVEL 1 |

FIG.18B

| MODEL | HDD2 |
|---|---|
| STORAGE METHOD | EXT3<br>RAID-5 |
| CORRESPONDING ALGORITHM | DES<br>3-DES<br>AES |
| JOB APPARATUS SAFETY | LEVEL 3 |

FIG.18C

| MODEL | HDD1 |
|---|---|
| STORAGE METHOD | FAT<br>RAID-5 |
| CORRESPONDING ALGORITHM | DES<br>3-DES |
| JOB APPARATUS SAFETY | LEVEL 1 |

FIG.19A

| MODEL | EVALUATION POINT | |
|---|---|---|
| HDD1 | 3 | |
| HDD2 | 10 | |
| OTHER | 1 | |

FIG.19B

| STORAGE METHOD | | |
|---|---|---|
| FAT | 0 | |
| NTFS | 2 | |
| EXT2 | 3 | |
| EXT3 | 4 | |
| RAID-5 | 2 | |
| RAID-10 | 3 | |

FIG.19C

| CORRESPONDING ALGORITHM | EVALUATION POINT | |
|---|---|---|
| DES | 1 | |
| 3-DES | 3 | |
| AES | 5 | |

FIG.19D

| SAFETY | EVALUATION POINT | COMMEND |
|---|---|---|
| LEVEL 1 | 1 | USUAL NETWORK PRINTER |
| LEVEL 2 | 3 | SET NETWORK PRINTER |
| LEVEL 3 | 10 | FORTRESSED SERVER |

US 7,855,796 B2

PRINT JOB DISTRIBUTING AND HOLDING SYSTEM, PRINTING SYSTEM, PRINT JOB HOLDING APPARATUS, PRINTER, PRINT JOB HOLDING APPARATUS CONTROL PROGRAM, PRINTER CONTROL PROGRAM, PRINT JOB HOLDING APPARATUS CONTROL METHOD, AND PRINTER CONTROL METHOD

BACKGROUND

1. Technical Field

The present invention relates to a printing system in which plural printers are connected to one another via a network, and, more particularly to a print job distributing and holding system, a printing system, a print job holding apparatus, a printer, a print job holding apparatus control program, a printer control program, a print job holding apparatus control method, and a printer control method that are suitable for distributing and holding plural print jobs for the respective printers.

2. Related Art

There is a technique for allowing a user to print a print job that the user has suspended at arbitrary timing like a technique used in the printing system disclosed in JP-A-9-269880.

There is also a technique for controlling a capacity limit (quota) for each user, for example, performing timeout management for a print job and for controlling a holding capacity of a print job, for example, limiting the number of jobs like a technique used in an image forming apparatus disclosed in JP-A-11-225255.

The related art disclosed in JP-A-9-269880 is suitable when a user desires to secure confidentiality of a document to be printed. However, when print jobs concentrate on a specific printer, it is likely that shortage of a capacity of a storage device for storing print jobs occurs in the printer and the print jobs sent to the printer cannot be held.

In the related art disclosed in JP-A-11-225255, shortage of a capacity of a storage device for storing print jobs occurs less easily. However, it is likely that, since print jobs are controlled, when the number of suspended print jobs reaches an upper limit of the limited number of print jobs, even if there is another print job that a user desires to hold, it is impossible to suspend the print job. This causes inconvenience for the user.

SUMMARY

Thus, an advantage of some aspects of the invention is to provide a print job distributing and holding system, a printing system, a print job holding apparatus, a printer, a print job holding apparatus control program, a printer control program, a print job holding apparatus control method, and a printer control method that are capable of distributing and holding, in a printing system in which plural printers are connected to one another via a network, plural print jobs for the respective printers.

According to a first aspect of the invention, there is provided a print job distributing and holding system capable of distributing and holding, in a printing system in which plural printers for executing print processing on the basis of plural print jobs are connected via a network, the plural print jobs corresponding to the respective printers in the plural printers. The print job distributing and holding system connects plural print job holding apparatuses corresponding to the plural printers, respectively, via the network to be capable of performing data communication with one another. Each of the print job holding apparatuses includes a print job holding unit, a print job holding entrusting unit, a print job substitute holding unit, an entrusted print job transmitting unit, an acquisition request transmitting unit, and a print job transmitting unit. The print job holding unit holds a print job sent to the print job holding apparatus via the network. The print job holding entrusting unit entrusts, when a predetermined condition is satisfied, another print job holding apparatus with holding of the print job sent to the print job holding apparatus via the network. The print job substitute holding unit holds a print job, holding of which is entrusted by another print job holding apparatus, in association with information on the another print job holding apparatus that entrusts holding of the print job. The entrusted print job transmitting unit transmits, in response to an acquisition request for the print job from the another print job holding apparatus, a print job held by the print job holding apparatus corresponding to the acquisition request to the another print job holding apparatus that requests acquisition of the print job. The acquisition request transmitting unit transmits an acquisition request for the print job, holding of which is entrusted to the another print job holding apparatus, to the another print job holding apparatus. The print job transmitting unit transmits a print job corresponding to a print instruction given to a printer corresponding to the print job holding apparatus to the printer.

With such a constitution, the print job holding apparatus is capable of holding, using the print job holding unit, a print job sent to the print job holding apparatus via the network. The print job holding apparatus is capable of entrusting, using the print job holding entrusting unit, the another print job holding apparatus with holding of the print job sent to the print job holding apparatus via the network when the predetermined condition is satisfied. The print job holding apparatus is capable of holding, using the print job substitute holding unit, a print job, holding of which is entrusted by the another print job holding apparatus, in association with information on the another print job holding apparatus that entrusts holding of the print job. The print job holding apparatus is capable of transmitting, using the entrusted print job transmitting unit, the print job corresponding to the acquisition request held by the print job holding apparatus to the another print job holding apparatus that requests acquisition of the print job in response to acquisition request for the print job from the another print job holding apparatus. The print job holding apparatus is capable of transmitting, using the print job transmitting unit, a print job corresponding to a print instruction given to a printer corresponding to the print job holding apparatus to the printer.

Therefore, each of the print job holding apparatuses can entrust, when a predetermined condition is satisfied, for example, when the print job holding apparatus cannot hold a print job sent to the print job holding apparatus, the another print job holding apparatus with holding of the print job. Thus, even when the print job holding apparatus cannot hold a print job, the print job holding apparatus can cause the another print job holding apparatus to hold the print job without, for example, deleting the print job. Therefore, it is possible to efficiently hold a print job for each of the print job holding apparatuses using the plural print job holding apparatuses. It is also possible to always acquire a print job for the print job holding apparatus held by the another print job holding apparatus and transmit the print job to a printer corresponding to the print job holding apparatus. Consequently, there is an advantage that a user can cause an arbitrary printer to perform print processing for a target print job at arbitrary timing.

The print job includes various pieces of information related to print processing. For example, the print job includes information on a system user who instructs printing, setting information concerning content of the print processing such as color printing, monochrome printing, and high-quality printing, and print data body such as image data and document data that are actually printed on a print medium such as a print sheet. The same holds true for respective forms of the printing system, the print job holding apparatus, the print job holding apparatus control program and the print job holding apparatus control method, the printer, and the printer control program and the printer control method described below.

The predetermined condition is a condition that is satisfied when the print job holding unit of the print job holding apparatus is in a predetermined condition because of a problem concerning a holding capacity of the print job holding unit (shortage of the holding capacity, etc.), a problem concerning an operation of the print job holding unit (occurrence of an error due to, for example, a failure, etc.), and the like. The predetermined condition is a condition that is satisfied, for example, when the print job holding apparatus cannot hold all or a part of print jobs sent to the print job holding apparatus. Besides, the predetermined condition is a condition not related to the print job holding unit. For example, there are the following conditions: timing at which a print job is sent corresponds to a predetermined date and time, a predetermined time frame, or the like such as a date and time, a time frame, or the like when a large number of holding requests for print jobs are sent to the print job holding apparatus; an order of print jobs sent is a predetermined order, for example, when a print job of personnel in managerial positions such as a general manager or a manager is sent after a print job of a common company employee; and although a transmission destination of a print job is the print job holding apparatus, a transmission source of the print job is a predetermined transmission source (or a sender), for example, an apparatus at the transmission source of the print job (or a desk of the sender) is near a printer corresponding to the another print job holding apparatus. These conditions may be satisfied individually or may be satisfied as a combination of plural conditions. The same holds true for respective forms of the print job holding apparatus, the print job holding apparatus control program and the print job holding apparatus control method, and the printing system described below.

Entrusting holding of a print job means that the print job holding apparatus has another print job holding apparatus hold a print job, which is sent to the print job holding apparatus, on behalf of the print job holding apparatus. Specifically, the entrustment includes various forms. For example, the print job holding apparatus causes the another print job holding apparatus to store all or a part of the print jobs sent to the print job holding apparatus. The print job holding apparatus separates all or a part of the print jobs sent to the print job holding apparatus, transmits the print jobs to the another print job holding apparatus, and causes the another print job holding apparatus to store the print jobs. The print job holding apparatus causes the another print job holding apparatus to store a print job sent to the print job holding apparatus in association with information on the print job holding apparatus. With respect to these forms, the print job holding entrusting unit performs transmission processing for a print job, holding of which is entrusted. The transmission processing includes processing for adding information on the print job holding apparatus and special information such as a command for instructing entrustment to a header of a relevant print job and transmitting the print job to the another print job holding apparatus entrusted with holding of the print job or transmitting, separately from the print job, special information including a command for instructing entrustment to the another print job holding apparatus entrusted with holding of the print job. When there are plural other print job holding apparatuses, the print job holding entrusting unit performs, for example, processing for selecting other print job holding apparatuses entrusted with holding of the print job out of the plural print job holding apparatuses (selecting appropriate ones as print job holding apparatuses entrusted with holding of the print job). Forms of entrustment of holding of the print job, transmission processing for the print job, and selection processing for another print job holding apparatus entrusted with holding of the print job are not limited to the examples of the forms described above. The same holds true for respective forms of the print job holding apparatus, the print job holding apparatus control program and the print job holding apparatus control method, and the printing system described below.

It is preferable that the print job holding entrusting unit performs processing for entrusting the another print job holding apparatus with holding of the print job by transmitting entrustment request information including information on the print job holding apparatus that entrusts holding of the print job and information on an entrustment instruction to the another print job holding apparatus.

With such a constitution, information of the print job holding apparatus that entrusts holding of the print job is known from the entrustment request information. Therefore, there is an advantage that the print job holding apparatuses entrusted with holding of the print job can easily hold the print job in association with the information on the print job holding apparatus that entrusts holding of the print job.

It is preferable that, when there are plural other print job holding apparatuses, the print job holding entrusting unit selects a print job holding apparatus entrusted with holding of the print job out of the plural other print job holding apparatuses on the basis of information on the plural other print job holding apparatuses and transmits the entrustment request information to the print job holding apparatus selected.

With such a constitution, there is an advantage that, when there are plural other print job holding apparatuses that are candidates of a print job holding apparatus entrusted with holding of a print job, it is possible to select a print job holding apparatus appropriate as a print job holding apparatus entrusted with holding of a print job and entrust the print job holding apparatus with holding of a print job.

The information on the other print job holding apparatuses includes information indicating holding capacities, performance, and the like of the print job holding apparatuses. The same holds true for respective forms of the print job holding apparatus, the print job holding apparatus control program and the print job holding apparatus control method, and the printing system described below.

It is preferable that the predetermined condition is satisfied when the print job holding apparatus cannot hold the print job sent to the print job holding apparatus via the network.

With such a constitution, for example, when the print job holding apparatus cannot hold a print job sent thereto because a holding capacity thereof is insufficient, it is possible to cause another print job holding apparatus to hold the print job. Thus, for example, there is an advantage that it is possible to efficiently hold a print job of the print job holding apparatus with a large processing load using plural print job holding apparatuses.

It is preferable that the print job holding apparatus acquires, when a free space capable of holding the print job, holding of which is entrusted to the another print job holding apparatus, is formed in the holding capacity, the print job from the another print job holding apparatus, in which the print job is stored, using the acquisition request transmitting unit.

With such a constitution, for example, when the print job holding apparatus causes another print job holding apparatus to hold a print job sent to the print job holding apparatus because a holding capacity of the print job holding apparatus is insufficient, it is possible to recover the print job from the another print job holding apparatus when a free space capable of holding the print job is formed in the holding capacity in the print job holding apparatus. This makes it easy to hold a print job sent to the print job holding apparatus in the print job holding apparatus itself. Therefore, there is an advantage that it is possible to prevent a storage capacity of another print job holding apparatus from being unnecessarily compressed and it is possible to make it easy to transmit a target print job to a printer corresponding to the print job holding apparatus without applying a load to the network.

It is preferable that the print job holding apparatus includes a connection state monitoring unit and a print job deleting unit. The connection state monitoring unit periodically monitors, concerning a print job, holding of which is entrusted to the print job holding apparatus by the another print job holding apparatus and which is held in the print job holding apparatus, whether the another print job holding apparatus that entrusts holding of the print job is connected to the network. The print job deleting unit deletes, when it is judged by the connection state monitoring unit that the another print job holding apparatus that entrusts holding of the print job is not connected for a predetermined period, the print job, holding of which is entrusted to the print job holding apparatus by the another print job holding apparatus and which is held in the print job holding apparatus.

With such a constitution, concerning a print job, holding of which is entrusted to the print job holding apparatus by the another print job holding apparatus and which is held in the print job holding apparatus, it is possible to periodically monitor, using the connection state monitoring unit, whether the another print job holding apparatus that entrusts holding of the print job is connected to the network. When it is judged by the connection state monitoring unit that the another print job holding apparatus that entrusts holding of the print job is not connected for a predetermined period, it is possible to delete, using the print job deleting unit, the print job, holding of which is entrusted to the print job holding apparatus by the another print job holding apparatus and which is held in the print job holding apparatus.

Therefore, in the print job holding apparatus that is entrusted with holding of a print job, when another print job holding apparatus that entrusts holding of the print job is not present on the network any more because of, for example, a change of a setting position, it is possible to delete the print job, holding of which is entrusted by the another print job holding apparatus not present on the network, without continuing to hold the print job. Therefore, there is an advantage that it is possible to more efficiently hold a print job in plural print job holding apparatuses.

It is preferable that the print job holding apparatus includes an operation state information acquisition request transmitting unit and an operation state information transmitting unit. The operation state information acquisition request transmitting unit transmits an acquisition request for operation state information indicating an operation state of the another print job holding apparatus to the another print job holding apparatus. The operation state information transmitting unit transmits, in response to an acquisition request for operation state information from the another print job holding apparatus, operation state information of the print job holding apparatus to the another print job holding apparatus that requests acquisition of the operation state information. The print job holding entrusting unit determines a print job holding apparatus entrusted with holding of the print job on the basis of the operation state information.

With such a constitution, it is possible to transmit, using the operation state information acquisition request transmitting unit, an acquisition request for operation state information indicating an operation state of another print job holding apparatus to the another print job holding apparatus. It is possible to transmit, using the operation state information transmitting unit, operation state information of the print job holding apparatus to the another print job holding apparatus that requests acquisition of the operation state information in response to the acquisition request for the operation state information from the another print job holding apparatus. The print job holding entrusting unit is capable of determining a print job holding apparatus entrusted with holding of the print job on the basis of the operation state information.

Therefore, it is possible to determine a print job holding apparatus entrusted with holding of a print job on the basis of operation states of other print job holding apparatuses indicating a remaining storage capacity, whether an error has occurred, and the like. Therefore, there is an advantage that it is possible to entrust an appropriate print job holding apparatus with holding of a print job.

The operation state information includes at least any one of information indicating a remaining storage capacity, whether an error has occurred, and the like, information (a model and a backup function of) on a storage device that holds a print job, information on a storage method for a print job (content of a RAID function (mirroring, etc.)), and the like. The same holds true for respective forms of the printing system, the print job holding apparatus, the print job holding apparatus control program and the print job holding apparatus control method, the printer, and the printer control program and the printer control method described below.

It is preferable that the operation state information includes at least one of information concerning safety of data holding in the print job holding apparatus and information concerning safety of data communication in the print job holding apparatus.

With such a constitution, the print job holding entrusting unit is capable of determining a print job holding apparatus entrusted with holding of a print job on the basis of at least one of information concerning safety of data holding in the print job holding apparatus and information concerning safety of data communication in the print job holding apparatus. Therefore, there is an advantage that it is possible to prevent or reduce occurrence of leakage, wrong deletion, and the like of a print job, holding of which is entrusted, by determining a print job holding apparatus with high safety as a print job holding apparatus entrusted with holding of a print job and entrust the print job holding apparatus with holding of the print job relatively safely.

The information concerning safety of data holding includes information such as a storage method (a RAID function, etc.) of a storage device (an HDD, etc.) provided in the print job holding apparatus, a type of an encryption algorithm at the time of data storage, setting information of the print job holding apparatus on the network, and the like. The same holds true for respective forms of the printing system, the print job holding apparatus, the print job holding apparatus control program and the print job holding apparatus control method, the printer, and the printer control program and the printer control method described below.

The information concerning safety of data communication includes security information for data communication such as information concerning a communication system of the print job holding entrusting unit and information of a type of an encryption algorithm used for communication. The same holds true for respective forms of the printing system, the print job holding apparatus, the print job holding apparatus control program and the print job holding apparatus control method, the printer, and the printer control program and the printer control method described below.

It is preferable that numerical values indicating effectiveness are set for each type of the respective pieces of information of the operation state information in advance and the print job holding entrusting unit determines a print job holding apparatus having a highest total value of the numerical values indicating effectiveness preferentially as a print job holding apparatus entrusted with holding of a print job.

With such a constitution, the print job holding entrusting unit can comprehensively evaluate effectiveness of a print job holding apparatus as a print job holding apparatus entrusted with holding of a print job according to a total value of numerical values indicating effectiveness. Therefore, there is an advantage that it is possible to easily determine a printer suitable for entrusting holding of a print job preferentially as a print job holding apparatus entrusted with holding of a print job, for example, to determine a print job holding apparatus with high safety and high apparatus performance out of print job holding apparatuses that normally operate and have sufficient free capacities among other print job holding apparatuses.

It is preferable that the print job holding entrusting unit divides a print job, holding of which is entrusted to the another print job holding apparatus, into three or more print job sections such that the print job can be restored from two or more print job sections and causes three or more separate print job holding apparatuses to hold the three or more print job sections, respectively. The acquisition request transmitting unit transmits an acquisition request for the print job to two or more print job holding apparatuses among the three or more print job holding apparatuses that hold the print job sections. The print job holding apparatus includes a print job restoring unit that restores the original print job from the two or more print job sections acquired from the other print job holding apparatuses.

With such a constitution, the print job holding entrusting unit divides a print job, holding of which is entrusted to another print job holding apparatus, into three or more print job sections in a state in which the print job can be restored from two or more print job sections and causes the three or more print job holding apparatuses to hold the print job sections, respectively. Thus, even if print job sections fewer than the restorable number of print job sections are leaked, it is impossible to learn content of the original print job. Therefore, there is an advantage that it is possible to improve security in holding a print job of a confidential document or the like.

As an example of the print job sections, there are print job sections from which an original print job can be restored by joining data included in a defined number of print job sections among the print job sections. For example, data of a print job is simply divided into plural print job sections, the print job sections are separated into plural sets such that a part of the data of a print job section overlaps a part of the data of other print job sections, it is possible to restore the original print job from any combination of the print job sections as long as there are a defined number of print sections. As another example of the print job sections, there are print job sections from which a print job can be restored according to arithmetic processing using data included in a defined number of print job sections among the print job sections. For example, print job sections are set as numerical values related to a certain equation and an inclination and an intercept of the equation can be derived as the original print job from the defined number of print job sections. If a method of causing redundancy of data that occurs in creating the print job sections is selected, it is expected that not only safety but also fault resistance of the print job holding unit. The same holds true for respective forms of the printing system, the print job holding apparatus, the print job holding apparatus control program and the print job holding apparatus control method, the printer, and the printer control program and the printer control method described below.

According to a second aspect of the invention, there is provided a printing system in which plural printers that execute print processing on the basis of a print job are connected via a network. Plural print job holding apparatuses corresponding to the plural printers, respectively, are connected via the network to be capable of performing data communication with one another. Each of the print job holding apparatuses includes a print job holding unit, a print job holding entrusting unit, a print job substitute holding unit, an entrusted print job transmitting unit, an acquisition request transmitting unit, and a print job transmitting unit. The print job holding unit holds a print job sent to the print job holding apparatus via the network. The print job holding entrusting unit entrusts, when a predetermined condition is satisfied, another print job holding apparatus with holding of the print job sent to the print job holding apparatus via the network. The print job substitute holding unit holds a print job, holding of which is entrusted by another print job holding apparatus, in association with information on the another print job holding apparatus that entrusts holding of the print job. The entrusted print job transmitting unit transmits, in response to an acquisition request for the print job from the another print job holding apparatus, a print job held by the print job holding apparatus corresponding to the acquisition request to the another print job holding apparatus that requests acquisition of the print job. The acquisition request transmitting unit transmits an acquisition request for the print job, holding of which is entrusted to the another print job holding apparatus, to the another print job holding apparatus. The print job transmitting unit transmits a print job corresponding to a print instruction given to a printer corresponding to the print job holding apparatus to the printer. The printer executes the print processing on the basis of the print job transmitted from the print job holding apparatus.

With such a constitution, the print job holding apparatus is capable of holding, using the print job holding unit, a print job sent to the print job holding apparatus via the network. The print job holding apparatus is capable of entrusting, using the print job holding entrusting unit, the another print job holding apparatus with holding of the print job sent to the print job holding apparatus via the network when the predetermined condition is satisfied. The print job holding apparatus is capable of holding, using the print job substitute holding unit, a print job, holding of which is entrusted by the another print job holding apparatus, in association with information on the another print job holding apparatus that entrusts holding of the print job. The print job holding apparatus is capable of transmitting, using the entrusted print job transmitting unit, the print job corresponding to the acquisition request held by the print job holding apparatus to the another print job holding apparatus that requests acquisition of the print job in response to acquisition request for the print job from the another print job holding apparatus. The print job holding apparatus is capable of transmitting, using the print job transmitting unit, a print job corresponding to a print instruction given to a printer corresponding to the print job holding apparatus to the printer.

The printer is capable of executing the print processing on the basis of the print job transmitted from the print job holding apparatus. Therefore, it is possible to obtain advantages equivalent to those in the print job distributing and holding system according to the first aspect of the invention.

It is assumed that the print processing includes a series of processing necessary for performing printing on the basis of a print job, for example, when a print job is formed in a page description language, first, analyzing print job information to secure an image memory of each page, expanding image information in the page to image memory information, acquiring text information in the page and acquiring font image data corresponding to the text information acquired, expanding the font image data to image memory information, and printing expanded image data. The same holds true for respective forms of the printing system, the print job holding apparatus, the print job holding apparatus control program and the print job holding apparatus control method, the printer, and the printer control program and the printer control method described below.

It is preferable that the print job holding entrusting unit performs processing for entrusting the another print job holding apparatus with holding of the print job by transmitting entrustment request information including information on the print job holding apparatus that entrusts holding of the print job and information on an entrustment instruction to the another print job holding apparatus.

With such a constitution, it is possible to obtain actions and advantages equivalent to those in the print job distributing and holding system according to the first aspect of the invention.

It is preferable that, when there are plural other print job holding apparatuses, the print job holding entrusting unit selects a print job holding apparatus entrusted with holding of the print job out of the plural other print job holding apparatuses on the basis of information on the plural other print job holding apparatuses and transmits the entrustment request information to the print job holding apparatus selected.

With such a constitution, it is possible to obtain actions and advantages equivalent to those in the print job distributing and holding system according to the first aspect of the invention.

It is preferable that the predetermined condition is satisfied when the print job holding apparatus cannot hold the print job sent to the print job holding apparatus via the network.

With such a constitution, it is possible to obtain actions and advantages equivalent to those in the print job distributing and holding system according to the first aspect of the invention.

It is preferable that the print job holding apparatus acquires, when a free space capable of holding the print job, holding of which is entrusted to the another print job holding apparatus, is formed in the holding capacity, the print job from the another print job holding apparatus, in which the print job is stored, using the acquisition request transmitting unit.

With such a constitution, it is possible to obtain actions and advantages equivalent to those in the print job distributing and holding system according to the first aspect of the invention.

It is preferable that the print job holding apparatus includes a connection state monitoring unit and a print job deleting unit that. The connection state monitoring unit periodically monitors, concerning a print job, holding of which is entrusted to the print job holding apparatus by the another print job holding apparatus and which is held in the print job holding apparatus, whether the another print job holding apparatus that entrusts holding of the print job is connected to the network. The print job deleting unit deletes, when it is judged by the connection state monitoring unit that the another print job holding apparatus that entrusts holding of the print job is not connected for a predetermined period, the print job, holding of which is entrusted to the print job holding apparatus by the another print job holding apparatus and which is held in the print job holding apparatus.

With such a constitution, it is possible to obtain actions and advantages equivalent to those in the print job distributing and holding system according to the first aspect of the invention.

It is preferable that the print job holding apparatus includes an operation state information acquisition request transmitting unit and an operation state information transmitting unit. The operation state information acquisition request transmitting unit transmits an acquisition request for operation state information indicating an operation state of the another print job holding apparatus to the another print job holding apparatus. The operation state information transmitting unit transmits, in response to an acquisition request for operation state information from the another print job holding apparatus, operation state information of the print job holding apparatus to the another print job holding apparatus that requests acquisition of the operation state information. The print job holding entrusting unit determines a print job holding apparatus entrusted with holding of the print job on the basis of the operation state information.

With such a constitution, it is possible to obtain actions and advantages equivalent to those in the print job distributing and holding system according to the first aspect of the invention.

It is preferable that the operation state information includes at least one of information concerning safety of data holding in the print job holding apparatus and information concerning safety of data communication in the print job holding apparatus.

With such a constitution, it is possible to obtain actions and advantages equivalent to those in the print job distributing and holding system according to the first aspect of the invention.

It is preferable that numerical values indicating effectiveness are set for each type of the respective pieces of information of the operation state information in advance, and the print job holding entrusting unit determines a print job holding apparatus having a highest total value of the numerical values indicating effectiveness preferentially as a print job holding apparatus entrusted with holding of a print job.

With such a constitution, it is possible to obtain actions and advantages equivalent to those in the print job distributing and holding system according to the first aspect of the invention.

It is preferable that the print job holding entrusting unit divides a print job, holding of which is entrusted to the another print job holding apparatus, into three or more print job sections such that the print job can be restored from two or more print job sections and causes three or more separate print job holding apparatuses to hold the three or more print job sections, respectively. The acquisition request transmitting unit transmits an acquisition request for the print job to two or more print job holding apparatuses among the three or more print job holding apparatuses that hold the print job sections. The print job holding apparatus includes a print job restoring unit that restores the original print job from the two or more print job sections acquired from the other print job holding apparatuses.

With such a constitution, it is possible to obtain actions and advantages equivalent to those in the print job distributing and holding system according to the first aspect of the invention.

According to a third aspect of the invention, there is provided a printing system in which plural printers are connected via a network to be capable of performing data communication with one another. Each of the printers includes a print job holding unit, a print job holding entrusting unit, a print job substitute holding unit, an entrusted print job transmitting unit, an acquisition request transmitting unit that, and a print processing unit. The print job holding unit holds a print job sent to the printer via the network. The print job holding entrusting unit entrusts, when a predetermined condition is satisfied, another printer with holding of the print job sent to the printer via the network. The print job substitute holding unit holds a print job, holding of which is entrusted by another printer, in association with information on the another printer that entrusts holding of the print job. The entrusted print job transmitting unit transmits, in response to an acquisition request for the print job from the another printer, a print job held by the printer corresponding to the acquisition request to the another printer that requests acquisition of the print job. The acquisition request transmitting unit transmits an acquisition request for the print job, holding of which is entrusted to the another printer, to the another printer. The print processing unit that performs print processing on the basis of the print job.

With such a constitution, the printer is capable of holding, using the print job holding unit, a print job sent to the printer via the network. The printer is capable of entrusting, using the print job holding entrusting unit, the another printer with holding of the print job sent to the printer via the network when the predetermined condition is satisfied. The printer is capable of transmitting, using the entrusted print job transmitting unit, in response to acquisition request for the print job from the another printer, the print job corresponding to the acquisition request held by the printer to the another printer that requests acquisition of the print job. The printer is capable of transmitting, using the acquisition request transmitting unit, an acquisition request for the print job, holding of which is entrusted to the another printer to the another printer. The printer is capable of performing, using the print processing unit, print processing on the basis of the print job.

Therefore, each of the printer can entrust, when a predetermined condition is satisfied, for example, when the printer cannot hold a print job sent to the printer, the another printer with holding of the print job. Thus, even when the printer cannot hold a print job, the printer can cause the another printer to hold the print job without, for example, deleting the print job. Therefore, it is possible to efficiently hold a print job for each of the printers using the plural printers. It is also possible to always acquire a print job for the printer held by the another printer. Consequently, there is an advantage that a user can cause an arbitrary printer to perform print processing for a target print job at arbitrary timing.

The predetermined condition is a condition that is satisfied when the print job holding unit of the printer is in a predetermined condition because of a problem concerning a holding capacity of the print job holding unit, a problem concerning an operation of the print job holding unit, and the like. The predetermined condition is a condition that is satisfied, for example, when the printer cannot hold all or a part of print jobs sent to the printer. Besides, the predetermined condition is a condition not related to the print job holding unit. For example, there are the following conditions: timing at which a print job is sent corresponds to a predetermined date and time, a predetermined time frame, or the like such as a date and time, a time frame, or the like when a large number of holding requests for print jobs are sent to the printer; an order of print jobs sent is a predetermined order, for example, when a print job of personnel in managerial positions such as a general manager or a manager is sent after a print job of a common company employee; although a transmission destination of a print job is the printer, a transmission source of the print job is a predetermined transmission source (or a sender), for example, an apparatus at the transmission source of the print job (or a desk of the sender) is near the another printer. These conditions may be satisfied individually or may be satisfied as a combination of plural conditions. The same holds true for respective forms of the printer, the printer control programs and the printer control method described below.

Entrusting holding of the print job means that the printer has the another printer hold a print job, which is sent to the printer, on behalf of the printer. Specifically, the entrustment includes various forms. For example, the printer causes the another printer to store all or a part of the print jobs sent to the printer. The printer separates all or a part of the print jobs sent to the printer, transmits the print job to the another printer, and causes the another printer to store the print job. The printer causes the another printer to store the print job sent to the printer in association with information on the printer. With respect to these forms, the print job holding entrusting unit performs transmission processing for a print job, holding of which is entrusted. The transmission processing includes processing for adding information on the printer and special information such as a command for instructing entrustment to a header of a relevant print job and transmitting the print job to the another printer entrusted with holding of the print job or transmitting, separately from the print job, special information including a command for instructing entrustment to the another printer entrusted with holding of the print job. When there are plural other printers, the print job holding entrusting unit performs, for example, processing for selecting other printers entrusted with holding of the print job out of the plural printers (selecting appropriate ones as printers entrusted with holding of the print job). Forms of entrustment of holding of the print job, transmission processing for the print job, and selection processing for another printer entrusted with holding of the print job are not limited to the examples of the forms described above. The same holds true for respective forms of the printer, the printer control program, and the printer control method described below.

It is preferable that the print job holding entrusting unit performs processing for entrusting the another printer with holding of the print job by transmitting entrustment request information including information on the printer that entrusts holding of the print job and information on an entrustment instruction to the another printer.

With such a constitution, information of the printer that entrusts holding of the print job is known from the entrustment request information. Therefore, there is an advantage that the printers entrusted with holding of the print job can easily hold the print job in association with the information on the printer that entrusts holding of the print job.

It is preferable that, when there are plural other printers, the print job holding entrusting unit selects a printer entrusted with holding of the print job out of the plural other printers on the basis of information on the plural other printers and transmits the entrustment request information to the printer selected.

With such a constitution, there is an advantage that, when there are plural other print job holding apparatuses that are candidates of a print job holding apparatus entrusted with holding of a print job, it is possible to select a print job holding apparatus appropriate as a print job holding apparatus entrusted with holding of a print job and entrust the print job holding apparatus with holding of a print job.

The information on the other printers includes information indicating holding capacities, performance, and the like of the printers. The same holds true for respective forms of the printer, the printer control program, and the printer control method described below.

It is preferable that the predetermined condition is satisfied when the printer cannot hold the print job sent to the printer via the network.

With such a constitution, for example, when the printer cannot hold a print job sent thereto because a holding capacity thereof is insufficient, it is possible to cause another printer to hold the print job. Thus, for example, there is an advantage that it is possible to efficiently hold a print job of the printer with a large processing load using plural printers.

It is preferable that the printer acquires, when a free space capable of holding the print job, holding of which is entrusted to the another printer, is formed in the holding capacity, the print job from the another printer, in which the print job is stored, using the acquisition request transmitting unit.

With such a constitution, for example, when the printer causes another printer to hold a print job sent to the printer because a holding capacity of the printer is insufficient, it is possible to recover the print job from the another printer when a free space capable of holding the print job is formed in the holding capacity in the printer. This makes it easy to hold a print job sent to the printer in the printer itself. Therefore, there is an advantage that it is possible to prevent a storage capacity of another printer from being unnecessarily compressed and it is possible to make it easy to acquire a target print job in the printer without applying a load to the network.

It is preferable that the printer includes a connection state monitoring unit a print job deleting unit. The connection state monitoring unit periodically monitors, concerning a print job, holding of which is entrusted to the printer by the another printer and which is held in the printer, whether the another printer that entrusts holding of the print job is connected to the network. The print job deleting unit that deletes, when it is judged by the connection state monitoring unit that the another printer that entrusts holding of the print job is not connected for a predetermined period, the print job, holding of which is entrusted to the printer by the another printer and which is held in the printer.

With such a constitution, concerning a print job, holding of which is entrusted to the printer by the another printer and which is held in the printer, it is possible to periodically monitor, using the connection state monitoring unit, whether the another printer that entrusts holding of the print job is connected to the network. When it is judged by the connection state monitoring unit that the another printer that entrusts holding of the print job is not connected for a predetermined period, it is possible to delete, using the print job deleting unit, the print job, holding of which is entrusted to the printer by the another printer and which is held in the printer.

Therefore, in the printer that is entrusted with holding of a print job, when another printer that entrusts holding of the print job is not present on the network any more because of, for example, a change of a setting position, it is possible to delete the print job, holding of which is entrusted by the another printer not present on the network, without continuing to hold the print job. Therefore, there is an advantage that it is possible to more efficiently hold a print job in plural printers.

It is preferable that the printer includes an operation state information acquisition request transmitting unit and an operation state information transmitting unit. The operation state information acquisition request transmitting unit transmits an acquisition request for operation state information indicating an operation state of the another printer to the another printer. The operation state information transmitting unit transmits, in response to an acquisition request for operation state information from the another printer, operation state information of the printer to the another printer that requests acquisition of the operation state information. The print job holding entrusting unit determines a printer entrusted with holding of the print job on the basis of the operation state information.

With such a constitution, it is possible to transmit, using the operation state information acquisition request transmitting unit, an acquisition request for operation state information indicating an operation state of another printer to the another printer. It is possible to transmit, using the operation state information transmitting unit, operation state information of the printer to the another printer that requests acquisition of the operation state information in response to the acquisition request for the operation state information from the another printer. The print job holding entrusting unit is capable of determining a printer entrusted with holding of the print job on the basis of the operation state information.

Therefore, it is possible to determine a printer entrusted with holding of a print job on the basis of operation states of other printers indicating a remaining storage capacity, whether an error has occurred, and the like. Therefore, there is an advantage that it is possible to entrust an appropriate printer with holding of a print job.

It is preferable that the operation state information includes at least one of information concerning safety of data holding in the printer and information concerning safety of data communication in the printer.

With such a constitution, the print job holding entrusting unit is capable of determining a printer entrusted with holding of a print job on the basis of at least one of information concerning safety of data holding in the printer and information concerning safety of data communication in the printer. Therefore, there is an advantage that it is possible to prevent or reduce occurrence of leakage, wrong deletion, and the like of a print job, holding of which is entrusted, by determining a printer with high safety as a printer entrusted with holding of a print job and entrust the printer with holding of the print job relatively safely.

It is preferable that numerical values indicating effectiveness are set for each type of the respective pieces of information of the operation state information in advance, and the print job holding entrusting unit determines a printer having a highest total value of the numerical values indicating effectiveness preferentially as a printer entrusted with holding of a print job.

With such a constitution, the print job holding entrusting unit can comprehensively evaluate effectiveness of a printer as a printer entrusted with holding of a print job according to a total value of numerical values indicating effectiveness. Therefore, there is an advantage that it is possible to easily determine a printer suitable for entrusting holding of a print job preferentially as a printer entrusted with holding of a print job, for example, to determine a printer with high safety and high apparatus performance out of printers that normally operate and have sufficient free capacities among other printers.

It is preferable that the print job holding entrusting unit divides a print job, holding of which is entrusted to the another printer, into three or more print job sections such that the print job can be restored from two or more print job sections and causes three or more separate printers to hold the three or more print job sections, respectively. The acquisition request transmitting unit transmits an acquisition request for the print job to two or more printers among the three or more printers that hold the print job sections. The printer includes a print job restoring unit that restores the original print job from the two or more print job sections acquired from the other printers.

With such a constitution, the print job holding entrusting unit divides a print job, holding of which is entrusted to another printer, into three or more print job sections in a state in which the print job can be restored from two or more print job sections and causes the three or more printers to hold the print job sections, respectively. Thus, even if print job sections fewer than the restorable number of print job sections are leaked, it is impossible to learn content of the original print job. Therefore, there is an advantage that it is possible to improve security in holding a print job of a confidential document or the like.

According to a fourth aspect of the invention, there is provided a print job holding apparatus that holds a print job in a printing system in which plural printers that execute print processing on the basis of the print job are connected via a network. The print job holding apparatus includes a print job holding unit, a print job holding entrusting unit, a print job substitute holding unit, an entrusted print job transmitting unit, an acquisition request transmitting unit, and a print job transmitting unit. The print job holding unit holds a print job sent to the print job holding apparatus via the network. The print job holding entrusting unit entrusts, when a predetermined condition is satisfied, another print job holding apparatus with holding of the print job sent to the print job holding apparatus via the network. The print job substitute holding unit holds a print job, holding of which is entrusted by another print job holding apparatus, in association with information on the another print job holding apparatus that entrusts holding of the print job. The entrusted print job transmitting unit transmits, in response to an acquisition request for the print job from the another print job holding apparatus, a print job held by the print job holding apparatus corresponding to the acquisition request to the another print job holding apparatus that requests acquisition of the print job. The acquisition request transmitting unit transmits an acquisition request for the print job, holding of which is entrusted to the another print job holding apparatus, to the another print job holding apparatus. The print job transmitting unit transmits a print job corresponding to a print instruction given to a printer corresponding to the print job holding apparatus to the printer.

With such a constitution, it is possible to obtain actions and advantages equivalent to those in the print job distributing and holding system according to the first aspect of the invention or the printing system according to the second aspect of the invention.

It is preferable that the print job holding entrusting unit performs processing for entrusting the another print job holding apparatus with holding of the print job by transmitting entrustment request information including information on the print job holding apparatus and information on an entrustment instruction to the another print job holding apparatus.

With such a constitution, it is possible to obtain actions and advantages equivalent to those in the print job distributing and holding system according to the first aspect of the invention or the printing system according to the second aspect of the invention.

It is preferable that, when there are plural other print job holding apparatuses, the print job holding entrusting unit selects a print job holding apparatus entrusted with holding of the print job out of the plural other print job holding apparatuses on the basis of information on the plural other print job holding apparatuses and transmits the entrustment request information to the print job holding apparatus selected.

With such a constitution, it is possible to obtain actions and advantages equivalent to those in the print job distributing and holding system according to the first aspect of the invention or the printing system according to the second aspect of the invention.

It is preferable that the predetermined condition is satisfied when the print job holding apparatus cannot hold the print job sent to the print job holding apparatus via the network.

With such a constitution, it is possible to obtain actions and advantages equivalent to those in the print job distributing and holding system according to the first aspect of the invention or the printing system according to the second aspect of the invention.

It is preferable that the print job holding apparatus acquires, when a free space capable of holding the print job, holding of which is entrusted to the another print job holding apparatus, is formed in the holding capacity, the print job from the another print job holding apparatus, in which the print job is stored, using the acquisition request transmitting unit.

With such a constitution, it is possible to obtain actions and advantages equivalent to those in the print job distributing and holding system according to the first aspect of the invention or the printing system according to the second aspect of the invention.

It is preferable that the print job holding apparatus includes a connection state monitoring unit and a print job deleting unit. The connection state monitoring unit periodically monitors, concerning a print job, holding of which is entrusted to the print job holding apparatus by the another print job holding apparatus and which is held in the print job holding apparatus, whether the another print job holding apparatus that entrusts holding of the print job is connected to the network. The print job deleting unit deletes, when it is judged by the connection state monitoring unit that the another print job holding apparatus that entrusts holding of the print job is not connected for a predetermined period, the print job, holding of which is entrusted to the print job holding apparatus by the another print job holding apparatus and which is held in the print job holding apparatus.

With such a constitution, it is possible to obtain actions and advantages equivalent to those in the print job distributing and holding system according to the first aspect of the invention or the printing system according to the second aspect of the invention.

It is preferable that the print job holding apparatus includes an operation state information acquisition request transmitting unit an operation state information transmitting unit. The operation state information acquisition request transmitting unit transmits an acquisition request for operation state information indicating an operation state of the another print job holding apparatus to the another print job holding apparatus. The operation state information transmitting unit transmits, in response to an acquisition request for operation state information from the another print job holding apparatus, operation state information of the print job holding apparatus to the another print job holding apparatus that requests acquisition of the operation state information. The print job holding entrusting unit determines a print job holding apparatus entrusted with holding of the print job on the basis of the operation state information.

With such a constitution, it is possible to obtain actions and advantages equivalent to those in the print job distributing and holding system according to the first aspect of the invention or the printing system according to the second aspect of the invention.

It is preferable that the operation state information includes at least one of information concerning safety of data holding in the print job holding apparatus and information concerning safety of data communication in the print job holding apparatus.

With such a constitution, it is possible to obtain actions and advantages equivalent to those in the print job distributing and holding system according to the first aspect of the invention or the printing system according to the second aspect of the invention.

It is preferable that numerical values indicating effectiveness are set for each type of the respective pieces of information of the operation state information in advance and the print job holding entrusting unit determines a print job holding apparatus having a highest total value of the numerical values indicating effectiveness preferentially as a print job holding apparatus entrusted with holding of a print job.

With such a constitution, it is possible to obtain actions and advantages equivalent to those in the print job distributing and holding system according to the first aspect of the invention or the printing system according to the second aspect of the invention.

It is preferable that the print job holding entrusting unit divides a print job, holding of which is entrusted to the another print job holding apparatus, into three or more print job sections such that the print job can be restored from two or more print job sections and causes three or more separate print job holding apparatuses to hold the three or more print job sections, respectively. The acquisition request transmitting unit transmits an acquisition request for the print job to two or more print job holding apparatuses among the three or more print job holding apparatuses that hold the print job sections. The print job holding apparatus includes a print job restoring unit that restores the original print job from the two or more print job sections acquired from the other print job holding apparatuses.

With such a constitution, it is possible to obtain actions and advantages equivalent to those in the print job distributing and holding system according to the first aspect of the invention or the printing system according to the second aspect of the invention.

According to a fifth aspect of the invention, there is provided a print job holding apparatus control program used for controlling a print job holding apparatus that holds a print job in a printing system in which plural printers that execute print processing on the basis of the print job are connected via a network. The print job holding apparatus control program includes a program used for causing a computer to execute processing including a print job holding step, print job holding entrusting step, a print job substitute holding step, an entrusted print job transmitting step, an acquisition request transmitting step, and a print job transmitting step. The print job holding step is a step of holding a print job sent to the print job holding apparatus via the network. The print job holding entrusting step is a step of entrusting, when a predetermined condition is satisfied, another print job holding apparatus with holding of the print job sent to the print job holding apparatus via the network. The print job substitute holding step is a step of holding a print job, holding of which is entrusted by another print job holding apparatus, in the print job holding apparatus in association with information on the another print job holding apparatus that entrusts holding of the print job. The entrusted print job transmitting step is a step of transmitting, in response to an acquisition request for the print job from the another print job holding apparatus, a print job held by the print job holding apparatus corresponding to the acquisition request to the another print job holding apparatus that requests acquisition of the print job. The acquisition request transmitting step is a step of transmitting an acquisition request for the print job, holding of which is entrusted to the another print job holding apparatus, to the another print job holding apparatus. The print job transmitting step is a step of transmitting a print job corresponding to a print instruction given to a printer corresponding to the print job holding apparatus to the printer.

With such a constitution, it is possible to obtain actions and advantages equivalent to those in the print job distributing and holding system according to the first aspect of the invention or the printing system according to the second aspect of the invention when the computer reads the program and executes the processing in accordance with the program read.

It is preferable that, in the print job holding entrusting step, processing for entrusting the another print job holding apparatus with holding of the print job is performed by transmitting entrustment request information including information on the print job holding apparatus and information on an entrustment instruction to the another print job holding apparatus.

With such a constitution, it is possible to obtain actions and advantages equivalent to those in the print job distributing and holding system according to the first aspect of the invention or the printing system according to the second aspect of the invention when the computer reads the program and executes the processing in accordance with the program read.

It is preferable that, when there are plural other print job holding apparatuses, in the print job holding entrusting step, a print job holding apparatus entrusted with holding of the print job is selected out of the plural other print job holding apparatuses on the basis of information on the plural other print job holding apparatuses and the entrustment request information is transmitted to the print job holding apparatus selected.

With such a constitution, it is possible to obtain actions and advantages equivalent to those in the print job distributing and holding system according to the first aspect of the invention or the printing system according to the second aspect of the invention when the computer reads the program and executes the processing in accordance with the program read.

It is preferable that the predetermined condition is satisfied when the print job sent to the print job holding apparatus via the network cannot be held in the print job holding step.

With such a constitution, it is possible to obtain actions and advantages equivalent to those in the print job distributing and holding system according to the first aspect of the invention or the printing system according to the second aspect of the invention when the computer reads the program and executes the processing in accordance with the program read.

It is preferable that, when a free space capable of holding the print job, holding of which is entrusted to the another print job holding apparatus, is formed in the holding capacity, the print job is acquired from the another print job holding apparatus, in which the print job is stored, via the acquisition request transmitting step.

With such a constitution, it is possible to obtain actions and advantages equivalent to those in the print job distributing and holding system according to the first aspect of the invention or the printing system according to the second aspect of the invention when the computer reads the program and executes the processing in accordance with the program read.

It is preferable that the print job holding apparatus control program further includes a program used for causing the computer to execute processing including a connection state monitoring step and a print job deleting step. The connection state monitoring step is a step of periodically monitoring, concerning a print job, holding of which is entrusted to the print job holding apparatus by the another print job holding apparatus and which is held in the print job holding apparatus, whether the another print job holding apparatus that entrusts holding of the print job is connected to the network. The print job deleting step is a step of deleting, when it is judged in the connection state monitoring step that the another print job holding apparatus that entrusts holding of the print job is not connected for a predetermined period, the print job, holding of which is entrusted to the print job holding apparatus by the another print job holding apparatus and which is held in the print job holding apparatus.

With such a constitution, it is possible to obtain actions and advantages equivalent to those in the print job distributing and holding system according to the first aspect of the invention or the printing system according to the second aspect of the invention when the computer reads the program and executes the processing in accordance with the program read.

It is preferable that the print job holding apparatus control program further includes a program used for causing the computer to execute processing including an operation state information acquisition request transmitting step and an operation state information transmitting step. The operation state information acquisition request transmitting step is a step of transmitting an acquisition request for operation state information indicating an operation state of the another print job holding apparatus to the another print job holding apparatus. The operation state information transmitting step is a step of transmitting, in response to an acquisition request for operation state information from the another print job holding apparatus, operation state information of the print job holding apparatus to the another print job holding apparatus that requests acquisition of the operation state information. In the print job holding entrusting step, a print job holding apparatus entrusted with holding of the print job is determined on the basis of the operation state information.

With such a constitution, it is possible to obtain actions and advantages equivalent to those in the print job distributing and holding system according to the first aspect of the invention or the printing system according to the second aspect of the invention when the computer reads the program and executes the processing in accordance with the program read.

It is preferable that the operation state information includes at least one of information concerning safety of data holding in the print job holding apparatus and information concerning safety of data communication in the print job holding apparatus.

With such a constitution, it is possible to obtain actions and advantages equivalent to those in the print job distributing and holding system according to the first aspect of the invention or the printing system according to the second aspect of the invention when the computer reads the program and executes the processing in accordance with the program read.

It is preferable that numerical values indicating effectiveness are set for each type of the respective pieces of information of the operation state information in advance, and, in the print job holding entrusting step, a print job holding apparatus having a highest total value of the numerical values indicating effectiveness is preferentially determined as a print job holding apparatus entrusted with holding of a print job.

With such a constitution, it is possible to obtain actions and advantages equivalent to those in the print job distributing and holding system according to the first aspect of the invention or the printing system according to the second aspect of the invention when the computer reads the program and executes the processing in accordance with the program read.

It is preferable that, in the print job holding entrusting step, a print job, holding of which is entrusted to the another print job holding apparatus, is divided into three or more print job sections such that the print job can be restored from two or more print job sections and three or more separate print job holding apparatuses are caused to hold the three or more print job sections, respectively. In the acquisition request transmitting step, an acquisition request for the print job is transmitted to two or more print job holding apparatuses among the three or more print job holding apparatuses that hold the print job sections. The print job holding apparatus control program further includes a program used for causing the computer to execute processing including restoring the original print job from the two or more print job sections acquired from the other print job holding apparatuses.

With such a constitution, it is possible to obtain actions and advantages equivalent to those in the print job distributing and holding system according to the first aspect of the invention or the printing system according to the second aspect of the invention when the computer reads the program and executes the processing in accordance with the program read.

According to a sixth aspect of the invention, there is provided a computer readable recording medium having stored therein a print job holding apparatus control program. The print job holding apparatus control program according to the fifth aspect of the invention is recorded in the recording medium.

Consequently, it is possible to obtain actions and advantages equivalent to those in the print job holding apparatus control program according to the fifth aspect of the invention and it is also possible to easily exchange the print job holding apparatus control program via recording media such as a CD-ROM, a DVD-ROM, and an MO.

According to a seventh aspect of the invention, there is provided a print job holding apparatus control method used for controlling a print job holding apparatus that holds a print job in a printing system in which plural printers that execute print processing on the basis of the print job are connected via a network. The print job holding apparatus control method includes a print job holding step, a print job holding entrusting step, a print job substitute holding step, an entrusted print job transmitting step, an acquisition request transmitting step, and a print job transmitting step. The print job holding step is a step of holding a print job sent to the print job holding apparatus via the network. The print job holding entrusting step is a step of entrusting, when a predetermined condition is satisfied, another print job holding apparatus with holding of the print job sent to the print job holding apparatus via the network. The print job substitute holding step is a step of holding a print job, holding of which is entrusted by another print job holding apparatus, in the print job holding apparatus in association with information on the another print job holding apparatus that entrusts holding of the print job. The entrusted print job transmitting step is a step of transmitting, in response to an acquisition request for the print job from the another print job holding apparatus, a print job held by the print job holding apparatus corresponding to the acquisition request to the another print job holding apparatus that requests acquisition of the print job. The acquisition request transmitting step is a step of transmitting an acquisition request for the print job, holding of which is entrusted to the another print job holding apparatus, to the another print job holding apparatus. The print job transmitting step of transmitting a print job corresponding to a print instruction to given a printer corresponding to the print job holding apparatus to the printer.

Consequently, it is possible to obtain actions and advantages equivalent to those in the print job distributing and holding system according to the first aspect of the invention or the printing system according to the second aspect of the invention.

It is preferable that, in the print job holding entrusting step, processing for entrusting the another print job holding apparatus with holding of the print job is performed by transmitting entrustment request information including information on the print job holding apparatus and information on an entrustment instruction to the another print job holding apparatus.

Consequently, it is possible to obtain actions and advantages equivalent to those in the print job distributing and holding system according to the first aspect of the invention or the printing system according to the second aspect of the invention.

It is preferable that, when there are plural other print job holding apparatuses, in the print job holding entrusting step, a print job holding apparatus entrusted with holding of the print job is selected out of the plural other print job holding apparatuses on the basis of information on the plural other print job holding apparatuses and the entrustment request information is transmitted to the print job holding apparatus selected.

Consequently, it is possible to obtain actions and advantages equivalent to those in the print job distributing and holding system according to the first aspect of the invention or the printing system according to the second aspect of the invention.

It is preferable that the predetermined condition is satisfied when the print job sent to the print job holding apparatus via the network cannot be held in the print job holding step.

Consequently, it is possible to obtain actions and advantages equivalent to those in the print job distributing and holding system according to the first aspect of the invention or the printing system according to the second aspect of the invention.

It is preferable that, when a free space capable of holding the print job, holding of which is entrusted to the another print job holding apparatus, is formed in the holding capacity, the print job is acquired from the another print job holding apparatus, in which the print job is stored, via the acquisition request transmitting step.

Consequently, it is possible to obtain actions and advantages equivalent to those in the print job distributing and holding system according to the first aspect of the invention or the printing system according to the second aspect of the invention.

It is preferable that the print job holding apparatus control method further includes a connection state monitoring step and a print job deleting step. The connection state monitoring step is a step of periodically monitoring, concerning a print job, holding of which is entrusted to the print job holding apparatus by the another print job holding apparatus and which is held in the print job holding apparatus, whether the another print job holding apparatus that entrusts holding of the print job is connected to the network. The print job deleting step is a step of deleting, when it is judged in the connection state monitoring step that the another print job holding apparatus that entrusts holding of the print job is not connected for a predetermined period, the print job, holding of which is entrusted to the print job holding apparatus by the another print job holding apparatus and which is held in the print job holding apparatus.

Consequently, it is possible to obtain actions and advantages equivalent to those in the print job distributing and holding system according to the first aspect of the invention or the printing system according to the second aspect of the invention.

It is preferable that the print job holding apparatus control method further includes an operation state information acquisition request transmitting step and an operation state information transmitting step. The operation state information acquisition request transmitting step is a step of transmitting an acquisition request for operation state information indicating an operation state of the another print job holding apparatus to the another print job holding apparatus. The operation state information transmitting step is a step of transmitting, in response to an acquisition request for operation state information from the another print job holding apparatus, operation state information of the print job holding apparatus to the another print job holding apparatus that requests acquisition of the operation state information. In the print job holding entrusting step, a print job holding apparatus entrusted with holding of the print job is determined on the basis of the operation state information.

Consequently, it is possible to obtain actions and advantages equivalent to those in the print job distributing and holding system according to the first aspect of the invention or the printing system according to the second aspect of the invention.

It is preferable that the operation state information includes at least one of information concerning safety of data holding in the print job holding apparatus and information concerning safety of data communication in the print job holding apparatus.

Consequently, it is possible to obtain actions and advantages equivalent to those in the print job distributing and holding system according to the first aspect of the invention or the printing system according to the second aspect of the invention.

It is preferable that numerical values indicating effectiveness are set for each type of the respective pieces of information of the operation state information in advance, and, in the print job holding entrusting step, a print job holding apparatus having a highest total value of the numerical values indicating effectiveness preferentially as a print job holding apparatus entrusted with holding of a print job.

Consequently, it is possible to obtain actions and advantages equivalent to those in the print job distributing and holding system according to the first aspect of the invention or the printing system according to the second aspect of the invention.

It is preferable that, in the print job holding entrusting step, a print job, holding of which is entrusted to the another print job holding apparatus, is divided into three or more print job sections such that the print job can be restored from two or more print job sections and three or more separate print job holding apparatuses are caused to hold the three or more print job sections, respectively. In the acquisition request transmitting step, an acquisition request for the print job is transmitted to two or more print job holding apparatuses among the three or more print job holding apparatuses that hold the print job sections. The print job holding apparatus control method further includes restoring the original print job from the two or more print job sections acquired from the other print job holding apparatuses.

Consequently, it is possible to obtain actions and advantages equivalent to those in the print job distributing and holding system according to the first aspect of the invention or the printing system according to the second aspect of the invention.

According to an eighth aspect of the invention, there is provided a printer including a print job holding unit, a print job holding entrusting unit, a print job substitute holding unit, an entrusted print job transmitting unit, an acquisition request transmitting unit, and a print processing unit. The print job holding unit holds a print job sent to the printer via the network. The print job holding entrusting unit entrusts, when a predetermined condition is satisfied, another printer with holding of the print job sent to the printer via the network. The print job substitute holding unit holds a print job, holding of which is entrusted by another printer, in association with information on the another printer that entrusts holding of the print job. The entrusted print job transmitting unit transmits, in response to an acquisition request for the print job from the another printer, a print job held by the printer corresponding to the acquisition request to the another printer that requests acquisition of the print job. The acquisition request transmitting unit transmits an acquisition request for the print job, holding of which is entrusted to the another printer, to the another printer. The print processing unit performs print processing on the basis of the print job.

With such a constitution, it is possible to obtain actions and advantages equivalent to those in the printing system according to the third aspect of the invention.

It is preferable that the print job holding entrusting unit performs processing for entrusting the another printer with holding of the print job by transmitting entrustment request information including information on the printer and information on an entrustment instruction to the another printer.

With such a constitution, it is possible to obtain actions and advantages equivalent to those in the printing system according to the third aspect of the invention.

It is preferable that, when there are plural other printers, the print job holding entrusting unit selects a printer entrusted with holding of the print job out of the plural other printers on the basis of information on the plural other printers and transmits the entrustment request information to the printer selected.

With such a constitution, it is possible to obtain actions and advantages equivalent to those in the printing system according to the third aspect of the invention.

It is preferable that the predetermined condition is satisfied when the printer cannot hold the print job sent to the printer via the network.

With such a constitution, it is possible to obtain actions and advantages equivalent to those in the printing system according to the third aspect of the invention.

It is preferable that the printer acquires, when a free space capable of holding the print job, holding of which is entrusted to the another printer, is formed in the holding capacity, the print job from the another printer, in which the print job is stored, using the acquisition request transmitting unit.

With such a constitution, it is possible to obtain actions and advantages equivalent to those in the printing system according to the third aspect of the invention.

It is preferable that the printer includes a connection state monitoring unit and a print job deleting unit. The connection state monitoring unit periodically monitors, concerning a print job, holding of which is entrusted to the printer by the another printer and which is held in the printer, whether the another printer that entrusts holding of the print job is connected to the network. The print job deleting unit deletes, when it is judged by the connection state monitoring unit that the another printer that entrusts holding of the print job is not connected for a predetermined period, the print job, holding of which is entrusted to the printer by the another printer and which is held in the printer.

With such a constitution, it is possible to obtain actions and advantages equivalent to those in the printing system according to the third aspect of the invention.

It is preferable that the printer includes an operation state information acquisition request transmitting unit and an operation state information transmitting unit. The operation state information acquisition request transmitting unit transmits an acquisition request for operation state information indicating an operation state of the another printer to the another printer. The operation state information transmitting unit transmits, in response to an acquisition request for operation state information from the another printer, operation state information of the printer to the another printer that requests acquisition of the operation state information. The print job holding entrusting unit determines a printer entrusted with holding of the print job on the basis of the operation state information.

With such a constitution, it is possible to obtain actions and advantages equivalent to those in the printing system according to the third aspect of the invention.

It is preferable that the operation state information includes at least one of information concerning safety of data holding in the printer and information concerning safety of data communication in the printer.

With such a constitution, it is possible to obtain actions and advantages equivalent to those in the printing system according to the third aspect of the invention.

It is preferable that numerical values indicating effectiveness are set for each type of the respective pieces of information of the operation state information in advance, and the print job holding entrusting unit determines a printer having a highest total value of the numerical values indicating effectiveness preferentially as a printer entrusted with holding of a print job.

With such a constitution, it is possible to obtain actions and advantages equivalent to those in the printing system according to the third aspect of the invention.

It is preferable that the print job holding entrusting unit divides a print job, holding of which is entrusted to the another printer, into three or more print job sections such that the print job can be restored from two or more print job sections and causes three or more separate printers to hold the three or more print job sections, respectively. The acquisition request transmitting unit transmits an acquisition request for the print job to two or more printers among the three or more printers that hold the print job sections. The printer includes a print job restoring unit that restores the original print job from the two or more print job sections acquired from the other printers.

With such a constitution, it is possible to obtain actions and advantages equivalent to those in the printing system according to the third aspect of the invention.

According to a ninth aspect of the invention, there is provided a printer control program used for controlling each of plural printers in a printing system in which the plural printers are connected via a network to be capable of performing data communication each other. The printer control program includes a program used for causing a computer to execute processing including a print job holding step, a print job holding entrusting step, a print job substitute holding step, an entrusted print job transmitting step, an acquisition request transmitting step, and a print processing step. The print job holding step is a step of holding a print job sent to the printer via the network. The print job holding entrusting step is a step of entrusting, when a predetermined condition is satisfied, another printer with holding of the print job sent to the printer via the network. The print job substitute holding step is a step of holding a print job, holding of which is entrusted by another printer, in association with information on the another printer that entrusts holding of the print job. The entrusted print job transmitting step is a step of transmitting, in response to an acquisition request for the print job from the another printer, a print job held by the printer corresponding to the acquisition request to the another printer that requests acquisition of the print job. The acquisition request transmitting step is a step of transmitting an acquisition request for the print job, holding of which is entrusted to the another printer, to the another printer. The print processing step is a step of performing print processing on the basis of the print job.

With such a constitution, when the computer reads the program and executes the processing in accordance with the program read, it is possible to obtain actions and advantages equivalent to those in the printing system according to the third aspect of the invention.

It is preferable that, in the print job holding entrusting step, processing for entrusting the another printer with holding of the print job is performed by transmitting entrustment request information including information on the printer that entrusts holding of the print job and information on an entrustment instruction to the another printer.

With such a constitution, when the computer reads the program and executes the processing in accordance with the program read, it is possible to obtain actions and advantages equivalent to those in the printing system according to the third aspect of the invention.

It is preferable that, when there are plural other printers, in the print job holding entrusting step, a printer entrusted with holding of the print job is selected out of the plural other printers on the basis of information on the plural other printers and the entrustment request information is transmitted to the printer selected.

With such a constitution, when the computer reads the program and executes the processing in accordance with the program read, it is possible to obtain actions and advantages equivalent to those in the printing system according to the third aspect of the invention.

It is preferable that the predetermined condition is satisfied when the print job sent to the printer via the network cannot be held in the print job holding step.

With such a constitution, when the computer reads the program and executes the processing in accordance with the program read, it is possible to obtain actions and advantages equivalent to those in the printing system according to the third aspect of the invention.

It is preferable that, when a free space capable of holding the print job, holding of which is entrusted to the another printer, is formed in the holding capacity, the print job is acquired from the another printer, in which the print job is stored, via the acquisition request transmitting step.

With such a constitution, when the computer reads the program and executes the processing in accordance with the program read, it is possible to obtain actions and advantages equivalent to those in the printing system according to the third aspect of the invention.

It is preferable that the printer control program further includes a program used for causing the computer to execute processing including a connection state monitoring step and a print job deleting step. The connection state monitoring step is a step of periodically monitoring, concerning a print job, holding of which is entrusted to the printer by the another printer and which is held in the printer, whether the another printer that entrusts holding of the print job is connected to the network. The print job deleting step is a step of deleting, when it is judged in the connection state monitoring step that the another printer that entrusts holding of the print job is not connected for a predetermined period, the print job, holding of which is entrusted to the printer by the another printer and which is held in the printer.

With such a constitution, when the computer reads the program and executes the processing in accordance with the program read, it is possible to obtain actions and advantages equivalent to those in the printing system according to the third aspect of the invention.

It is preferable that the printer control program further includes a program used for causing the computer to execute processing including an operation state information acquisition request transmitting step and an operation state information transmitting step. The operation state information acquisition request transmitting step is a step of transmitting an acquisition request for operation state information indicating an operation state of the another printer to the another printer. The operation state information transmitting step is a step of transmitting, in response to an acquisition request for operation state information from the another printer, operation state information of the printer to the another printer that requests acquisition of the operation state information. In the print job holding entrusting step, a printer entrusted with holding of the print job is determined on the basis of the operation state information.

With such a constitution, when the computer reads the program and executes the processing in accordance with the program read, it is possible to obtain actions and advantages equivalent to those in the printing system according to the third aspect of the invention.

It is preferable that the operation state information includes at least one of information concerning safety of data holding in the printer and information concerning safety of data communication in the printer.

With such a constitution, when the computer reads the program and executes the processing in accordance with the program read, it is possible to obtain actions and advantages equivalent to those in the printing system according to the third aspect of the invention.

It is preferable that numerical values indicating effectiveness are set for each type of the respective pieces of information of the operation state information in advance, and, in the print job holding entrusting step, a printer having a highest total value of the numerical values indicating effectiveness is preferentially determined as a printer entrusted with holding of a print job.

With such a constitution, when the computer reads the program and executes the processing in accordance with the program read, it is possible to obtain actions and advantages equivalent to those in the printing system according to the third aspect of the invention.

It is preferable that, in the print job holding entrusting step, a print job, holding of which is entrusted to the another printer, is divided into three or more print job sections such that the print job can be restored from two or more print job sections and three or more separate printers are caused to hold the three or more print job sections, respectively. In the acquisition request transmitting step, an acquisition request for the print job is transmitted to two or more printers among the three or more printers that hold the print job sections. The printer control program further includes a program used for causing the computer to execute processing including restoring the original print job from the two or more print job sections acquired from the other printers.

With such a constitution, when the computer reads the program and executes the processing in accordance with the program read, it is possible to obtain actions and advantages equivalent to those in the printing system according to the third aspect of the invention.

According to a tenth aspect of the invention, there is provided a computer readable recording medium having stored therein a printer control program. The printer control program according to the ninth aspect of the invention is recorded in the recording medium.

Consequently, it is possible to obtain actions and advantages equivalent to those in the printer control program according to the ninth aspect of the invention and it is also possible to easily exchange the printer control program via recording media such as a CD-ROM, a DVD-ROM, and an MO.

According to an eleventh aspect of the invention, there is provided a printer control method used for controlling each of plural printers in a printing system in which the plural printers are connected via a network to be capable of performing data communication each other. The printer control method includes a print job holding step, a print job holding entrusting step, a print job substitute holding step, an entrusted print job transmitting step, an acquisition request transmitting step, and a print processing step. The print job holding step is a step of holding a print job sent to the printer via the network. The print job holding entrusting step is a step of entrusting, when a predetermined condition is satisfied, another printer with holding of the print job sent to the printer via the network. The print job substitute holding step is a step of holding a print job, holding of which is entrusted by another printer, in association with information on the another printer that entrusts holding of the print job. The entrusted print job transmitting step is a step of transmitting, in response to an acquisition request for the print job from the another printer, a print job held by the printer corresponding to the acquisition request to the another printer that requests acquisition of the print job. The acquisition request transmitting step is a step of transmitting an acquisition request for the print job, holding of which is entrusted to the another printer, to the another printer. The print processing step is a step of performing print processing on the basis of the print job.

Consequently, it is possible to obtain actions and advantages equivalent to those in the printing system according to the third aspect of the invention.

It is preferable that, in the print job holding entrusting step, processing for entrusting the another printer with holding of the print job is performed by transmitting entrustment request information including information on the printer that entrusts holding of the print job and information on an entrustment instruction to the another printer.

Consequently, it is possible to obtain actions and advantages equivalent to those in the printing system according to the third aspect of the invention.

It is preferable that, when there are plural other printers, in the print job holding entrusting step, a printer entrusted with holding of the print job is selected out of the plural other printers on the basis of information on the plural other printers and the entrustment request information is transmitted to the printer selected.

Consequently, it is possible to obtain actions and advantages equivalent to those in the printing system according to the third aspect of the invention.

It is preferable that the predetermined condition is satisfied when the print job sent to the printer via the network cannot be held in the print job holding step.

Consequently, it is possible to obtain actions and advantages equivalent to those in the printing system according to the third aspect of the invention.

It is preferable that, when a free space capable of holding the print job, holding of which is entrusted to the another printer, is formed in the holding capacity, the print job is acquired from the another printer, in which the print job is stored, via the acquisition request transmitting step.

Consequently, it is possible to obtain actions and advantages equivalent to those in the printing system according to the third aspect of the invention.

It is preferable that the printer control method further includes a connection state monitoring step and a print job deleting step. The connection state monitoring step is a step of periodically monitoring, concerning a print job, holding of which is entrusted to the printer by the another printer and which is held in the printer, whether the another printer that entrusts holding of the print job is connected to the network. The print job deleting step is a step of deleting, when it is judged in the connection state monitoring step that the another printer that entrusts holding of the print job is not connected for a predetermined period, the print job, holding of which is entrusted to the printer by the another printer and which is held in the printer.

Consequently, it is possible to obtain actions and advantages equivalent to those in the printing system according to the third aspect of the invention.

It is preferable that the printer control method further includes an operation state information acquisition request transmitting step and an operation state information transmitting step. The operation state information acquisition request transmitting step is a step of transmitting an acquisition request for operation state information indicating an operation state of the another printer to the another printer. The operation state information transmitting step is a step of transmitting, in response to an acquisition request for operation state information from the another printer, operation state information of the printer to the another printer that requests acquisition of the operation state information. In the print job holding entrusting step, a printer entrusted with holding of the print job is determined on the basis of the operation state information.

Consequently, it is possible to obtain actions and advantages equivalent to those in the printing system according to the third aspect of the invention.

It is preferable that the operation state information includes at least one of information concerning safety of data holding in the printer and information concerning safety of data communication in the printer.

Consequently, it is possible to obtain actions and advantages equivalent to those in the printing system according to the third aspect of the invention.

It is preferable that numerical values indicating effectiveness are set for each type of the respective pieces of information of the operation state information in advance, and, in the print job holding entrusting step, a printer having a highest total value of the numerical values indicating effectiveness is preferentially determined as a printer entrusted with holding of a print job.

Consequently, it is possible to obtain actions and advantages equivalent to those in the printing system according to the third aspect of the invention.

It is preferable that, in the print job holding entrusting step, a print job, holding of which is entrusted to the another printer, is divided into three or more print job sections such that the print job can be restored from two or more print job sections and three or more separate printers are caused to hold the three or more print job sections, respectively. In the acquisition request transmitting step, an acquisition request for the print job is transmitted to two or more printers among the three or more printers that hold the print job sections. The printer control method further includes restoring the original print job from the two or more print job sections acquired from the other printers.

Consequently, it is possible to obtain actions and advantages equivalent to those in the printing system according to the third aspect of the invention.

BRIEF DESCRIPTION OF THE DRAWINGS

The invention will be described with reference to the accompanying drawings, wherein like numbers reference like elements.

FIG. 13A is a diagram showing an example of a print job attribute information management table in a first printer 20A.

FIG. 13B is a diagram showing an example of a holding form of print data included in a print job.

FIG. 14 is a table showing an example of operation state information.

FIG. 15 is a diagram showing an example of a print job attribute information management table in a second printer 20B.

FIGS. 18A to 18C are tables showing examples of operation state information of printers 20A to 20C.

FIGS. 19A to 19D are tables showing examples of evaluation points for the respective pieces of operation state information in FIGS. 18A to 18C.

DESCRIPTION OF EXEMPLARY EMBODIMENTS

Exemplary embodiments of the invention will be explained with reference to the accompanying drawings. FIGS. 1 to 15 are diagrams for explaining a print job distributing and holding system, a printing system, a print job holding apparatus, a printer, a print job holding apparatus control program, a printer control program, a print job holding apparatus control method, and a printer control method according to embodiments of the invention.

Figure 1:
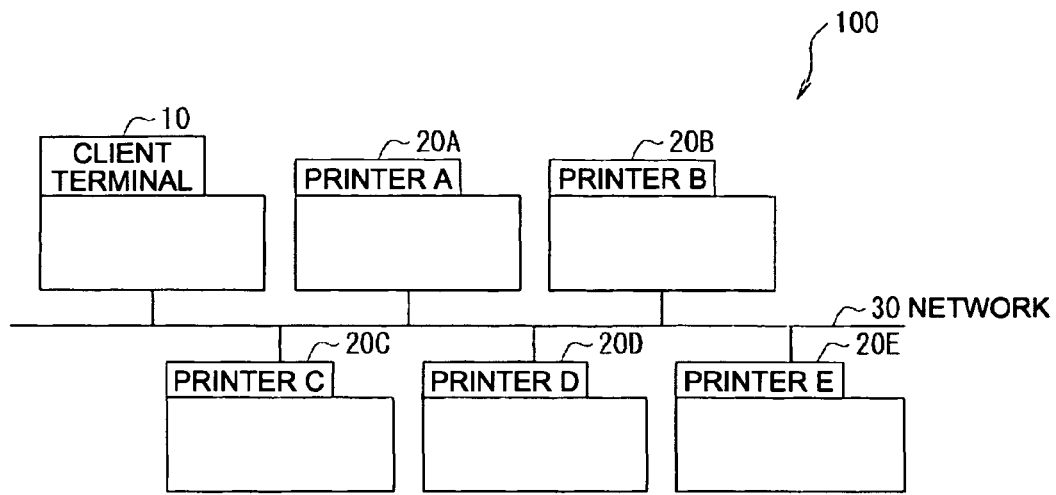
FIG. 1 is a schematic diagram showing a constitution of a printing system 100 according to an embodiment of the invention.

A constitution of a printing system according to an embodiment of the invention will be explained with reference to FIG. 1. FIG. 1 is a schematic diagram showing a constitution a printing system 100 according to the embodiment.

As shown in FIG. 1, the printing system 100 includes a client terminal 10 that performs processing for generating print jobs, processing for transmitting the print jobs generated to printers, and the like, first to fifth printers 20A to 20E that hold print jobs from the client terminal 10 and execute print processing for a print job corresponding to collation information among the print jobs held, and a network 30 constituted by a LAN, a WAN, or the like.

The client terminal 10 acquires a transmission instruction for a print job from a user and performs processing for generating a print job and processing for transmitting the print job to a designated printer according to the instruction. In the printing system 100 in this embodiment, the client terminal 10 among plural client terminals participates in the printing system 100. However, the number of client terminals is not limited to this and two or more client terminals may participate in the system. A detailed functional constitution of the client terminal 10 will be described later.

The first to the fifth printers 20A to 20E are personal printers that perform printing of print jobs corresponding to the collation information acquired. Moreover, the printers 20A to 20E can entrust the other printers with holding of print jobs sent to the printers when a predetermined condition is satisfied. In the printing system 100 in this embodiment, the five printers, namely, the first to the fifth printers 20A to 20E participate in the system. However, the number of printers is not limited to this as long as two or more printers participate in the system. A detailed functional constitution of the first to the fifth printers 20A to 20E will be described later.

The network 30 is a network constituted by a LAN, a WAN, or the Internet. The network 30 connects the client terminal 10 and the first to the fifth printers 20A to 20E to be capable of transmitting and receiving data among the apparatuses.

Figure 2:
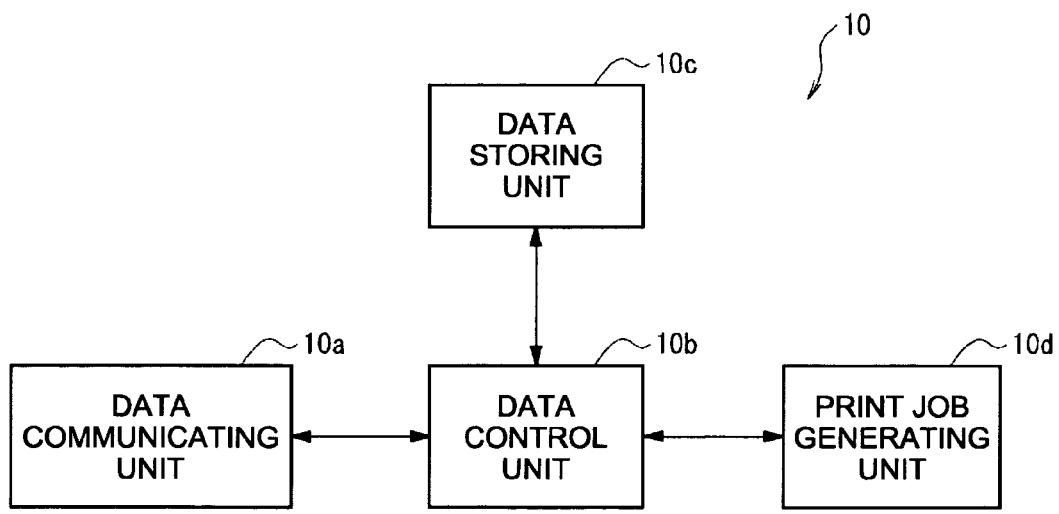
FIG. 2 is a block diagram showing a functional constitution of a client terminal 10.

A detailed functional constitution of the client terminal 10 will be explained with reference to FIG. 2. FIG. 2 is a block diagram showing a functional constitution of the client terminal 10.

As shown in FIG. 2, the client terminal 10 includes a data communicating unit 10a, a data control unit 10b, a data storing unit 10c, and a print job generating unit 10d.

The data communicating unit 10a has a function of transmitting data to and receiving data from the first to the fifth printers 20A to 20E via the network 30. The data communicating unit 10a transmits a print job generated by the print job generating unit 10d to any one of the first to the fifth printers 20A to 20E or receives data sent from external apparatuses connected to the network 30 such as the first to the fifth printers 20A to 20E according to an instruction from the data control unit 10b.

The data control unit 10b has functions of collectively controlling a flow of data in the client terminal 10 and processing in the respective components of the client terminal 10. For example, the data control unit 10b acquires setting information according to a print job transmission instruction from the user via an input device and transmits a generation instruction for a print job corresponding to the setting information to the print job generating unit 10d. The data control unit 10b transmits a transmission instruction to the data communicating unit 10a to instruct the data communicating unit 10a to transmit a print job generated by the print job generating unit 10d to a printer to which the print job is transmitted. The data control unit 10b controls exchange of data among the respective components. The data control unit 10b stores various data acquired via the data communicating unit 10a and the like in the data storing unit 10c. The data control unit 10b transmits, in response to a request from each of the components, the various data stored in the data storing unit 10c to the component that requests the various data.

The data storing unit 10c has a function of storing data necessary for various kinds of processing other than document data and image data generated by an editor and the like, various data received via the data communicating unit 10a, and various data acquired via a not-shown storage medium.

The print job generating unit 10d has a function of reading out the document data and the image data stored in the data storing unit 10c and adds information on a user who sends a print instruction, information on a printer to which the data is transmitted, and the like to the data read out to generate a print job.

The client terminal 10 includes a processor, a Random Access Memory (RAM), and a Read Only Memory (ROM) having dedicated programs stored therein, all of which are not shown in the figure. The client terminal 10 carries out the functions of the respective units described above by executing the dedicated programs using the processor. Some of the units carry out the functions thereof only with the dedicated programs and others carry out the functions thereof by controlling hardware using the dedicated program.

Figure 3:
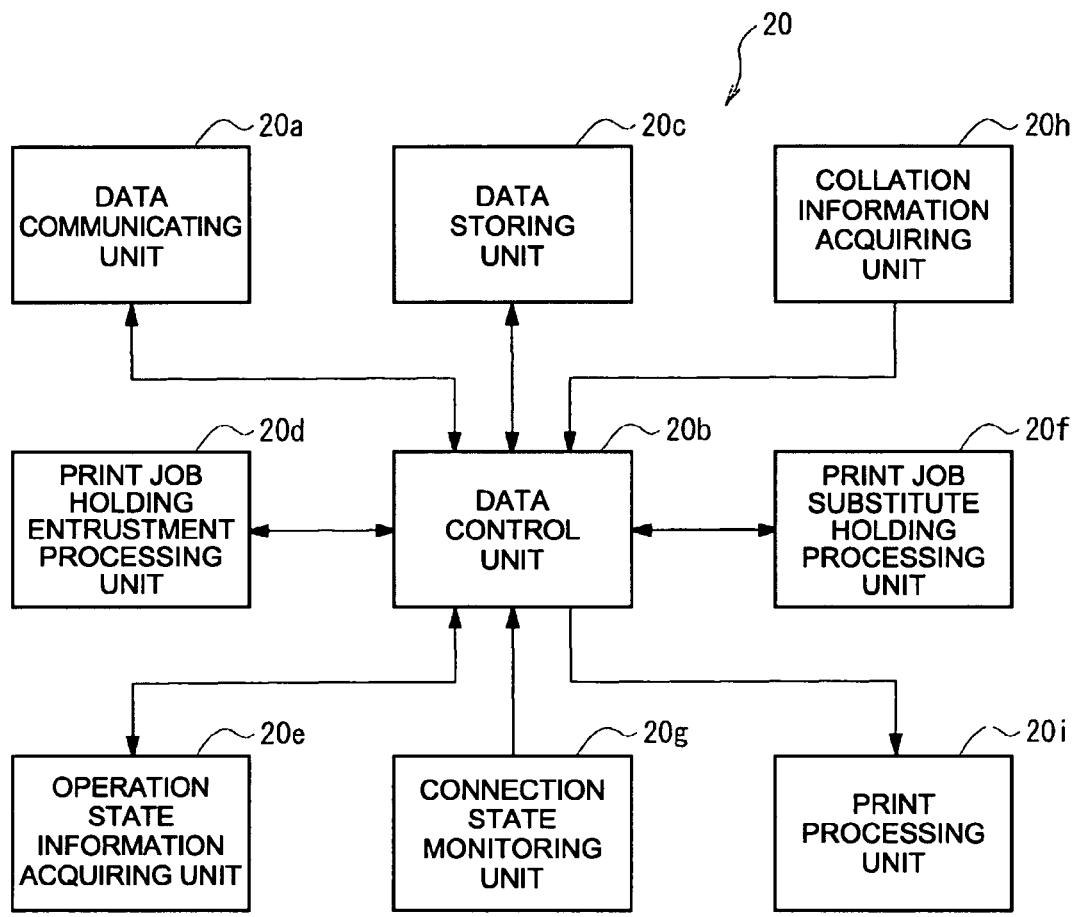
FIG. 3 is a block diagram showing a functional constitution of a printer 20A.

A detailed functional constitution of the first to the fifth printers 20A to 20E will be explained with reference to FIG. 3. The first to the fifth printers 20A to 20E have the same functions and constitutions. When it is unnecessary to distinguish the first to the fifth printers 20A to 20E, these printers are generally referred to as the printer 20. FIG. 3 is a block diagram showing a functional constitution of the printer 20A.

As shown in FIG. 3, the printer 20 includes a data communicating unit 20a, a data control unit 20b, a data storing unit 20c, a print job holding entrustment processing unit 20d, an operation state information acquiring unit 20e, a print job substitute holding processing unit 20f, and a connection state monitoring unit 20g.

The data communicating unit 20a has a function of transmitting data to and receiving data from the client terminal 10 and the other printers 20. For example, the data communicating unit 20a receives, via the network 30, a print job transmitted from the client terminal 10 and various data such as various kinds of acquisition request information, distributed data, deletion request information, and operation state information transmitted from the other printers 20. The data communicating unit 20a transmits various data such as various kinds of acquisition request information, distributed data, deletion request information, and operation state information to the other printers 20 via the network 30 according to an instruction from the data control unit 20b.

The data control unit 20b has functions of collectively controlling a flow of data in the printer 20 and processing in the respective components of the printer 20. For example, the data control unit 20b transmits, in response to acquisition requests for distributed data from other printers 20, a transmission instruction to the data communicating unit 20a to instruct the data communicating unit 20a to transmit the distributed data stored in the data storing unit 20c to the other printers 20 that request acquisition of the distributed data. The data control unit 20b transmits, in response to a request from each of the components, transmission instruction for various data such as various kinds of acquisition request information, distributed data, deletion request information, and operation state information to the data communicating unit 20a. The data control unit 20b transmits various data received via the data communicating unit 20a to the respective components. The data control unit 20b controls exchange of data among the respective components. The data control unit 20b stores various data acquired via the data communicating unit 20a and the like in the data storing unit 20c. The data control unit 20b transmits, in response to a request from each of the components, the various data stored in the data storing unit 20c to the component that requests the data. Moreover, the data control unit 20b has a function of deleting, in response to a deletion request from the client terminal 10 or the other printers 20, a relevant print job or relevant distributed data stored in the data storing unit 20c. The data control unit 20b has a function of managing a term of the distributed data stored in the data storing unit 20c. The data control unit 20b has a function of acquiring, on the basis of collation information acquired via the collation information acquiring unit 20h, a print job corresponding to the collation information to cause the print processing unit 20i to execute print processing.

The data storing unit 20c has a function of storing data necessary for processing by the respective components other than a print job received from the client terminal 10 and distributed data received from the other printers 20.

The print job holding entrustment processing unit 20d has a function of generating attribute information of a print job received via the data receiving unit 20a and stores the attribute information in the data storing unit 20c. The print job holding entrustment processing unit 20d has a function of performing holding entrustment processing for comparing a data size of the received print job and a remaining storage capacity in the data storing unit 20c, when the storage capacity is insufficient, judging that a predetermined condition is satisfied to divide the print job into plural distributed data using the publicly-known threshold secret sharing scheme, determining the printer 20 entrusted with holding of the plural distributed data on the basis of operation state information acquired by the operation state information acquiring unit 20e, and separately transmitting the plural distributed data to the printer 20 entrusted with holding of the plural distributed data determined. Moreover, the data storing unit 20c also has a function of monitoring a storage capacity of the data storing unit 20c, when a free space is formed in the storage capacity, acquiring distributed data, holding of which is entrusted to another printer 20 to restore the print job, and storing the print job in the data storing unit 20c again.

The operation state information acquiring unit 20e has a function of transmitting, in response to a request from the print job holding entrustment processing unit 20d, an acquisition request for operation state information indicating operation states of the respective printers 20 to the other printers 20 via the data control unit 20b and the data communicating unit 20a. The operation state information acquiring unit 20e has a function of transmitting the operation state information acquired via the data communicating unit 20a and the data control unit 20b to the print job holding entrustment processing unit 20d.

The print job substitute holding processing unit 20f has a function of storing, in response to holding entrustment requests from other printers 20, distributed data acquired from the other printers 20 in the data storing unit 20c in association with attribute information of the distributed data. The print job substitute holding processing unit 20f has a function of extending a holding term of distributed data in response to holding term extension requests from the other printer 20. The print job substitute holding processing unit 20*f* has a function of transmitting, in response to acquisition requests for distributed data from the other printers 20, the distributed data stored in the data storing unit 20*c* to the other printers 20 that requests acquisition of the distributed data.

The connection state monitoring unit 20*g* has a function of periodically monitoring, when distributed data, holding of which is entrusted by other printers 20, connection states of the other printers 20 to the network 30 and, when the other printers 20 are disconnected from the network 30 for a predetermined period, deleting the distributed data, holding of which is entrusted by the other printers 20, from the data storing unit 20*c*.

The printer 20 further includes a collation information acquiring unit 20*h* and a print processing unit 20*i*.

The collation information acquiring unit 20*h* includes a reader for a magnetic card and has a function of reading information of a magnetic card carried by a user (hereinafter referred to as collation information). In this embodiment, identification information of the user (or a group) is stored in the magnetic card as collation information.

The print processing unit 20*i* has a function of performing, on the basis of a print job held in the data storing unit 20*c* or a print job restored from distributed data, print processing for an image of image data, a document of document data, and the like included in the print job in response to a print instruction from the data control unit 20*b*.

The printer 20 includes a processor, a Random Access Memory (RAM), and a Read Only Memory (ROM) having dedicated programs stored therein, all of which are not shown in the figure. The printer 20 carries out the functions of the respective units described above by executing the dedicated programs using the processor. Some of the units carry out the functions thereof only with the dedicated programs and others carry out the functions thereof by controlling hardware using the dedicated program.

Figure 4:
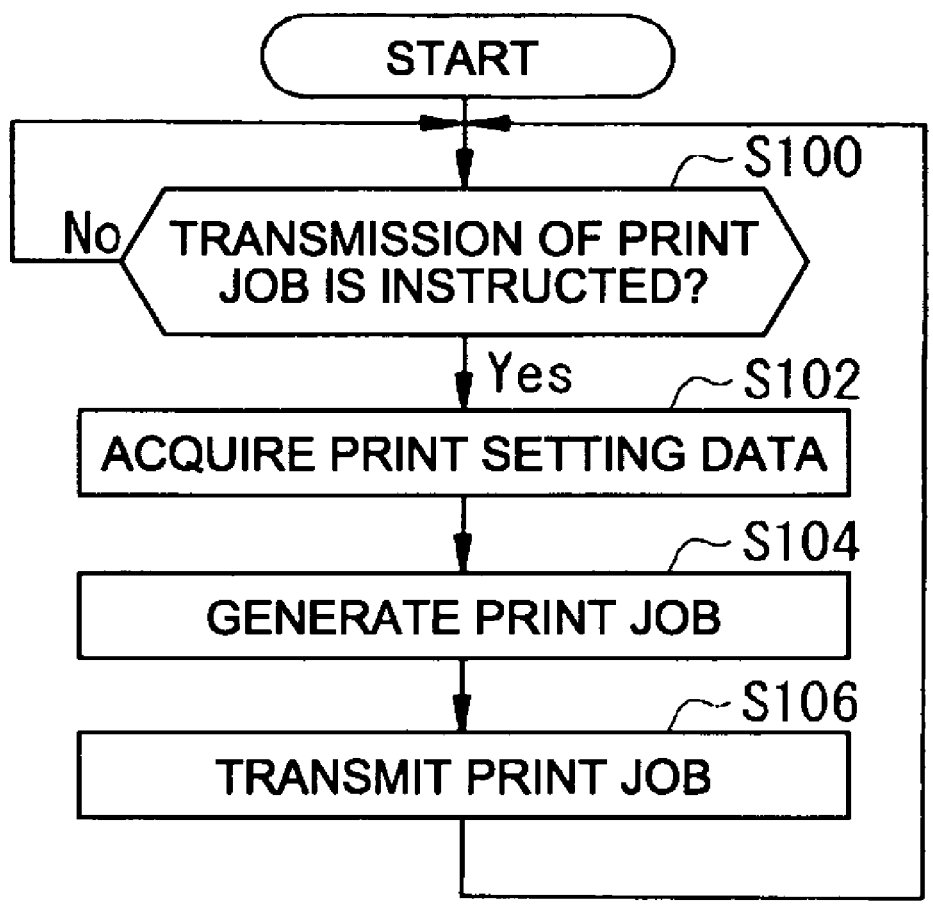
FIG. 4 is a flowchart of print job transmission processing in the client terminal 10.

The client terminal 10 starts a predetermined program stored in a predetermined area of the ROM using the CPU and executes print job transmission processing in a flowchart shown in FIG. 4 in accordance with the program.

FIG. 4 is a flowchart of the print job transmission processing in the client terminal 10.

When the CPU executes the print job transmission processing, as shown in FIG. 4, first, the client terminal 10 shifts to step S100.

In step S100, the client terminal 10 judges., in the data control unit 10*b*, whether a transmission request for a print job is given. When it is judged that a transmission instruction is given ("Yes" in step S100), the client terminal 10 shifts to step S102. When it is judged that a transmission instruction is not given ("No" in step S100), the client terminal 10 repeats the judgment until a transmission instruction is given.

When the client terminal 10 shifts to step S102, the client terminal 10 acquires, in the print job generating unit 10*d*, print setting information included in the transmission instruction via the data control unit 10*b* and shifts to step S104.

In step S104, the client terminal 10 acquires, in the print job generating unit 10*d*, data to be subjected to print processing (hereinafter referred to as print data) from the data storing unit 10*c* via the data control unit 10*b*. The client terminal 10 adds the print setting information acquired in step S104 and information on the user to the print data to generate a print job and shifts to step S106. In this embodiment, the user stores information, with which it is possible to identify the user, such as login information of the user in the data storing unit 10*c* in advance as user information.

In step S106, the client terminal 10 transmits, in the data control unit 10*b*, the print job generated in step S104 to the printer 20 to which the print job is transmitted via the data communicating unit 10*a* and shifts to step S100.

Figure 5:
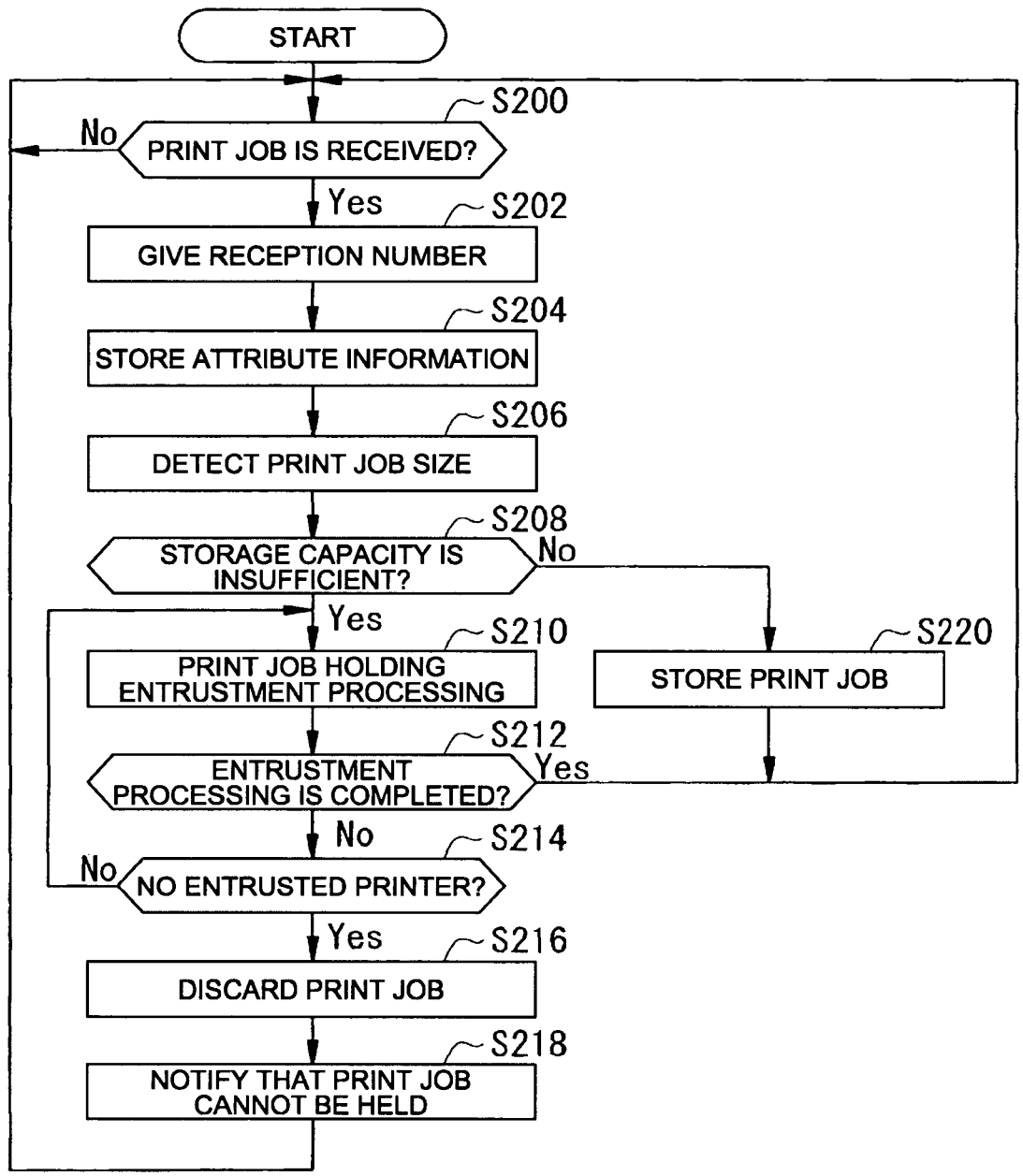
FIG. 5 is a flowchart of print job holding processing in a printer 20.

Moreover, the printer 20 starts a predetermined program stored in a predetermined area of the ROM using the CPU and executes print job holding processing in a flowchart shown in FIG. 5 in accordance with the program.

FIG. 5 is a flowchart of the print job holding processing in the printer 20.

When the CPU executes the print job holding processing, as shown in FIG. 5, first, the printer 20 shifts to step S200.

In step S200, the printer 20 judges, in the data control unit 20*b*, whether a print job is received from the client terminal 10 via the data communicating unit 20*a*. When it is judged that a print job is received ("Yes" in step S200), the printer 20 shifts to step S202. When it is judged that a print job is not received ("No" in step S200), the printer 20 repeats the judgment until a print job is received.

When the printer 20 shifts to step S202, the printer 20 gives, in the data control unit 20*b*, a reception number managed in the printer 20 to the print job received in step S200 and shifts to step S204.

In step S204, the printer 20 extracts, in the data control unit 20*b*, information such as user information and print setting from header information of the print job and generates attribute information on the basis of the information extracted. The printer 20 stores the attribute information generated in the data storing unit 20*c* in association with the reception number given to the print job in step S202 and shifts step S206.

In step S206, the printer 20 detects, in the data control unit 20*b*, a data size of the print job received in step S200 and shifts to step S208.

In step S208, the printer 20 compares, in the data control unit 20*b*, the data size detected in step S206 and a remaining storage capacity acquired from the data storing unit 20*c* to judge whether the storage capacity of the data storing unit 20*c* is insufficient for the print job received in step S200. When it is judged that the capacity is insufficient ("Yes" in step S208), the printer 20 shifts to step S210. When the capacity is not insufficient ("No" in step S208), the printer 20 shifts to step S220.

When the printer 20 shifts to step S210, the printer 20 executes, in the print job holding entrustment processing unit 20*d*, holding entrustment processing for the print job received in step S200 and shifts to step S212.

In step S212, the printer 20 judges, in the data control unit 20*b*, whether the holding entrustment processing for the print job is completed. When it is judged that the holding entrustment processing is completed ("Yes" in step S212), the printer 20 shifts to step S200. When it is judged that the holding entrustment processing is not completed ("No" in step S212), the printer 20 shifts to step S214.

When the printer 20 shifts to step S214, the printer 20 judges, in the data control unit 20*b*, whether there is no printer entrusted with holding of the print job. When it is judged that there is no printer entrusted with holding of the print job ("Yes" in step S214), the printer 20 shifts to step S216. When it is judged that there is a printer entrusted with holding of the print job ("No" in step S214), the printer 20 shifts to step S210.

When the printer 20 shifts to step S216, the printer 20 discards, in the data storing unit 20*b*, the print job received in step S200 and shifts to step S218.

In step S218, the printer 20 transmits, in the data control unit 20b, a message indicating that the print job cannot be held to the client terminal 10 via the data communicating unit 20a and shifts to step S200.

On the other hand, when there is a sufficient storage capacity in step S208 and the printer 20 shifts to step S220, the printer 20 stores, in the data control unit 20b, the print job received in step S200 in the data storing unit 20c in association with the attribute information and shifts to step S200.

Details of the print job holding entrustment processing in step S210 will be explained with reference to FIG. 6.

Figure 6:
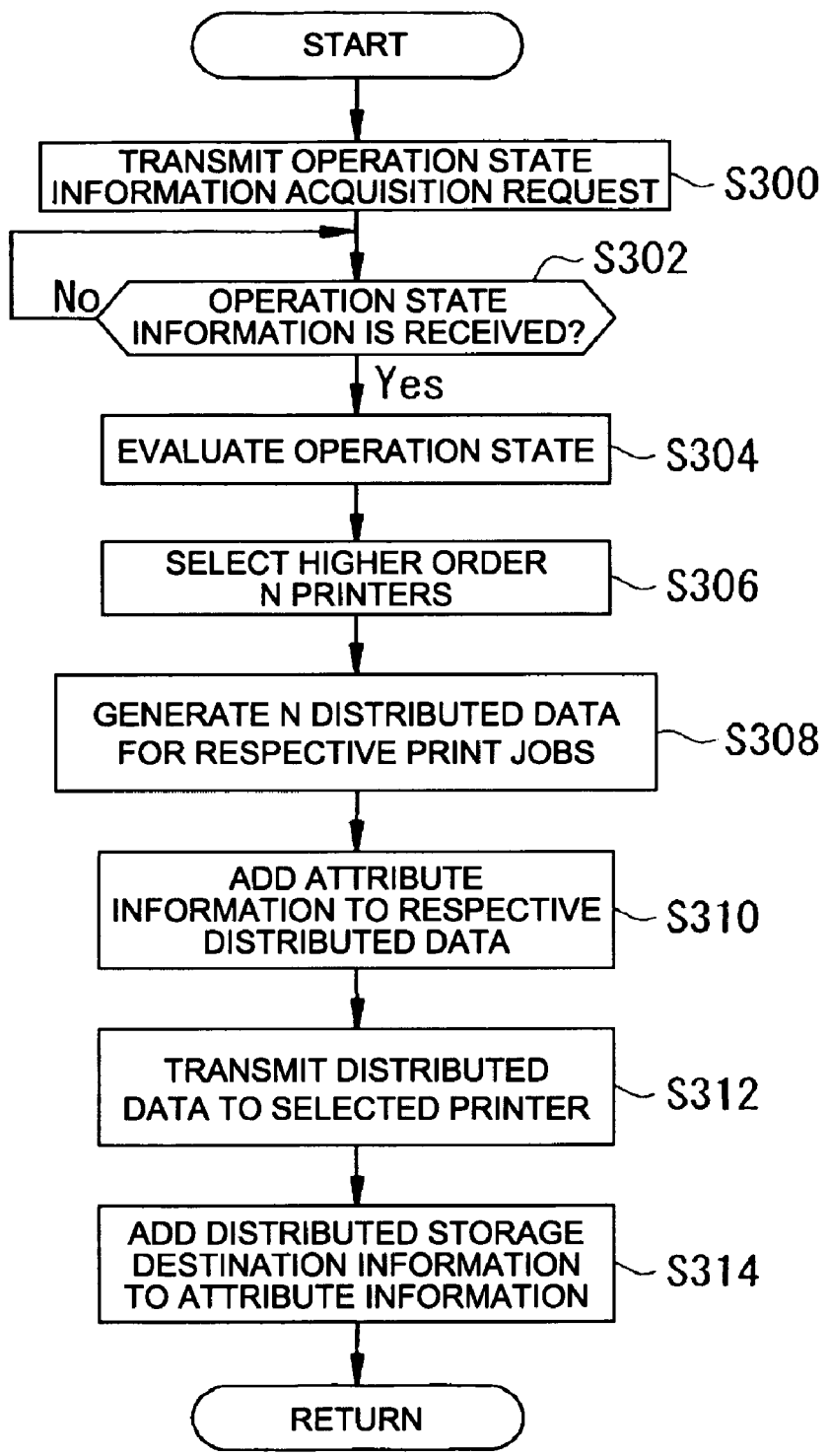
FIG. 6 is a flowchart of print job holding entrusting processing in the printer 20.

FIG. 6 is a flowchart of the print job holding entrustment processing in the printer 20.

The print job holding entrustment processing is processing for entrusting, when a storage capacity of the data storing unit 20c is insufficient and a print job cannot be stored, another printer 20 with holding of the print job. When the print job holding entrustment processing is executed in step S210, as shown in FIG. 6, first, the printer 20 shifts to step S300.

In step S300, the printer 20 transmits, in the print job holding entrustment processing unit 20d, an operation state information acquisition request to the another printer 20 via the operation state information acquiring unit 20e and shifts to step S302. The operation state information acquisition request includes, for example, data for requesting a response from the another printer 20 (like a publicly-known ping), data for requesting a remaining storage capacity of the another printer 20, and data for requesting status information such as an error occurrence state of the another printer 20.

In step S302, the printer 20 judges, in the print job holding entrustment processing unit 20d, whether operation state information is acquired. When it is judged that operation state information is acquired ("Yes" in step S302), the printer 20 shifts to step S304. When it is judged that operation state information is not acquired ("No" in step S302), the printer 20 repeats the judgment processing until operation state information is received.

When the printer 20 shifts to step S304, the printer 20 evaluates, in the print job holding entrustment processing unit 20d, operation states of the respective printers 20 from the operation state information acquired in step S302 and shifts to step S306. The printer 20 performs evaluation of operations states on the basis of responsiveness, a remaining storage capacity, normality or abnormality of the other printers 20.

In step S306, the printer 20 selects, in the print job holding entrustment processing unit 20d, higher order N (N is an integer equal to or larger than 3) other printers 20 in order from one with a highest evaluation on the basis of the evaluation result in step S306 and shifts to step S308.

In step S308, the printer 20 generates, in the print job holding entrustment processing unit 20d, N distributed data from a print job, entrustment of which is entrusted, using the publicly-known threshold secret sharing scheme and shifts to step S310. In other words, the printer 20 generates distributed data such that the original print job can be restored from K (N>K) distributed data among the N distributed data.

In step S310, the printer 20 adds, in the print job holding entrustment processing unit 20d, attribute information to the respective distributed data generated in step S308 and shifts to step S312. The attribute information is obtained by adding information on the printer apparatus 20 that entrusts holding of the print job and a holding term of the distributed data to the attribute information described above.

In step S312, the printer 20 transmits, in the print job holding entrustment processing unit 20d, the N distributed data generated in step S308 to the N other printers 20 separately from one another via the data control unit 20b and the data communicating unit 20a and shifts to step S314.

In step S314, the printer 20 adds, in the print job holding entrustment processing unit 20d, information on the N other printers 20 selected in step S306 to the attribute information of the print job, holding of which is entrusted, as distributed storage destination information, ends the series of processing, and returns to the original processing.

Figure 7:
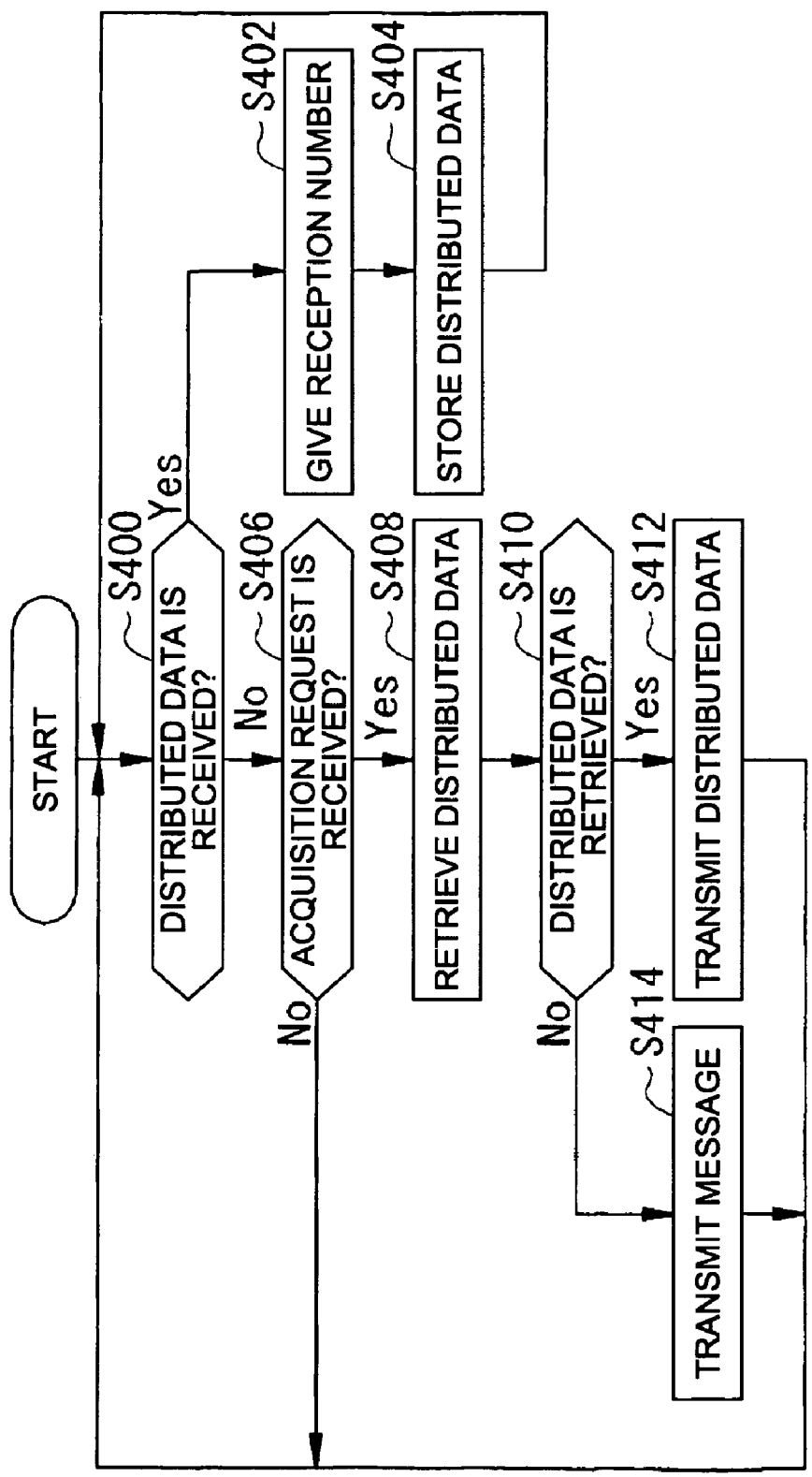
FIG. 7 is a flowchart of print job substitute holding processing in the printer 20.

Moreover, the printer 20 starts a predetermined program stored in a predetermined area of the ROM using the CPU and executes print job substitute holding processing shown in a flowchart in FIG. 7 in accordance with the program.

FIG. 7 is a flowchart of the print job substitute holding processing in the printer 20.

When the CPU executes the print job substitute holding processing, as shown in FIG. 7, first, the printer 20 shifts to step S400.

In step S400, the printer 20 judges, in the print job substitute holding processing unit 20f, whether distributed data added with attribute information is received from another printer 20 via the data communicating unit 20a and the data control unit 20b. When it is judged that distributed data added with attribute information is received ("Yes" in step S400), the printer 20 shifts to step S402. When it is judged that distributed data added with attribute information is not received ("No" in step S400), the printer 20 shifts to step S406.

When the printer 20 shifts to step S402, the printer 20 gives, in the print job substitute holding processing unit 20f, a reception number managed in the printer 20 to the distributed data and shifts to step S404.

In step S404, the printer 20 stores, in the print job substitute holding processing unit 20f, the distributed data, to which the reception number is given in step S402, in the data storing unit 20c via the data control unit 20b and shifts to step S400.

On the other hand, when the printer 20 shifts to step S406, the printer 20 judges, in the print job substitute holding processing unit 20f, whether an acquisition request for distributed data is received from another printer 20 via the data communicating unit 20a and the data control unit 20b. When it is judged that an acquisition request for distributed data is received ("Yes" in step S406), the printer 20 shifts to step S408. When it is judged that an acquisition request for distributed data is not received ("No" in step S406), the printer 20 shifts to step S400.

When the printer 20 shifts to step S408, the printer 20 searches for, in the print job substitute holding processing unit 20f, distributed data corresponding to the acquisition request from the data storing unit 20c and shifts to step S410.

In step S410, the printer 20 judges, in the print job substitute holding processing unit 20f, whether distributed data corresponding to the acquisition request is found. When it is judged that distribute data corresponding to the acquisition request is found ("Yes" in step S410), the printer 20 shifts to step S412. When it is judged that distribute data corresponding to the acquisition request is not found ("No" in step S410), the printer 20 shifts to step S414.

When the printer 20 shifts to step S412, the printer 20 transmits, in the print job substitute holding processing unit 20f, the distributed data found to the another printer 20, which requests acquisition of the distributed data, via the data control unit 20b and the data communicating unit 20a and shifts to step S400.

On the other hand, when the printer 20 shifts to step S414, the printer 20 transmits, in the print job substitute holding processing unit 20f, a message indicating that distributed data corresponding to the acquisition request is not found to the another printer 20, which requests acquisition of the distributed data, via the data control unit 20b and the data communicating unit 20a and shifts to step S400.

Figure 8:
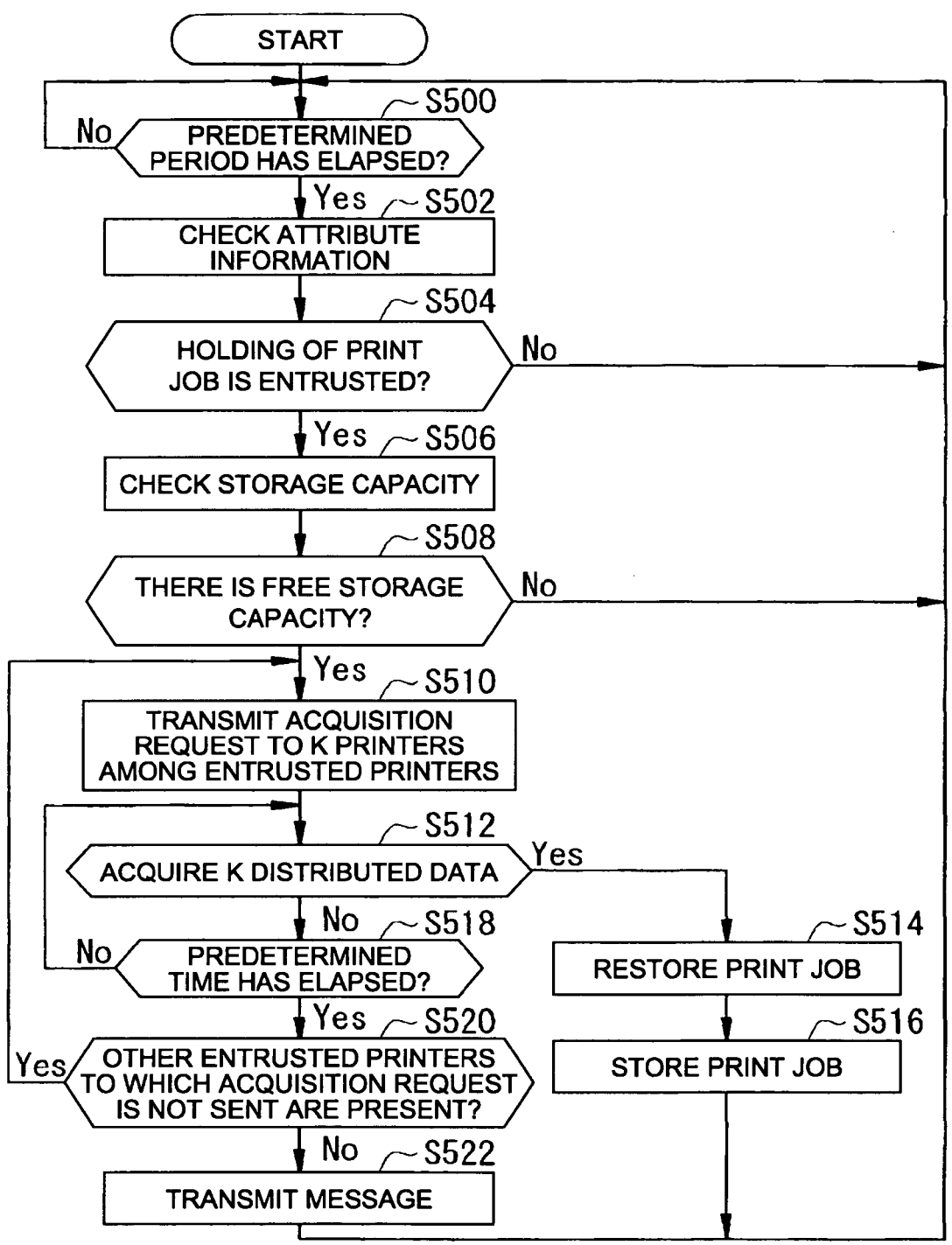
FIG. 8 is a flowchart of print job holding management processing in the printer 20.

Moreover, the printer 20 starts a predetermined program stored in a predetermined area of the ROM using the CPU and executes print job holding management processing shown in a flowchart in FIG. 8 in accordance with the program.

FIG. 8 is a flowchart of the print job holding management processing in the printer 20.

When the CPU executes the print job holding management processing, as shown in FIG. 8, first, the printer 20 shifts to step S500.

In step S500, the printer 20 judges, in the print job holding entrustment processing unit 20d, whether a predetermined period has elapsed using a not-shown timer. When it is judged that the predetermined period has elapsed ("Yes" in step S500), the printer 20 shifts to step S502. When it is judged that the predetermined period has not elapsed ("No" in step S500), the printer 20 repeats the judgment processing until the predetermined period elapses.

When the printer 20 shifts to step S502, the printer 20 checks, in the print job holding entrustment processing unit 20d, content of the attribute information stored in the data storing unit 20c and shifts to step S504.

In step S504, the printer 20 judges, in the print job holding entrustment processing unit 20d, whether holding of a print job is entrusted to another printer 20 on the basis of a result of the check in step S502. When it is judged that holding of the print job is entrusted to the another printer 20 ("Yes" in step S504), the printer 20 shifts to step S506. When it is judged that holding of the print job is not entrusted to the another printer 20 ("No" in step S504), the printer 20 clears a timer and shifts to step S500.

When the printer 20 shifts to step S506, the printer 20 checks, in the print job holding entrustment processing unit 20d, a remaining storage capacity of the data storing unit 20c and shifts to step S508.

In step S508, the printer 20 judges, in the print job holding entrustment processing unit 20d, whether there is a free space in the storage capacity on the basis of a result of the check in step S506. When it is judged that there is a free space in the storage capacity ("Yes" in step S508), the printer 20 shifts to step S510. When it is judged that there is no free space in the storage capacity ("No" in step S508), the printer 20 shifts to step S500.

When the printer 20 shifts to step S510, the printer 20 transmits, in the print job holding entrustment processing unit 20d, an acquisition request for distributed data to K printers 20 among printers entrusted with holding of the print job via the data control unit 20b and the data communicating unit 20a and shifts to step S512.

In step S512, the printer 20 judges, in the print job holding entrustment processing unit 20d, whether K distributed data are acquired from the another printer 20 via the data communicating unit 20a. When it is judged that K distributed data are acquired ("Yes" in step S512), the printer 20 shifts to step S514. When it is judged that K distributed data are not acquired ("No" in step S512), the printer 20 shifts to step S518.

When the printer 20 shifts to step S514, the printer 20 restores, in the print job holding entrustment processing unit 20d, the original print job from the K distributed data on the basis of the threshold secret sharing scheme and shifts to step S516.

In step S516, the printer 20 stores, in the print job holding entrustment processing unit 20d, the print job restored in the step S514 in the data storing unit 20c in association with the attribute information via the data control unit 20b, deletes information on printers in which the print job is distributed and shifts to step S500.

On the other hand, when the printer 20 cannot acquire K distributed data in step S512 and shifts to step S518, the printer 20 judges whether a predetermined time has elapsed using the not-shown timer. When it is judged that the predetermined time has elapsed ("Yes" in step S512), the printer 20 shifts to step S520. When it is judged that the predetermined time has not elapsed ("No" in step S512), the printer 20 shifts to step S512.

When the printer 20 shifts to step S520, the printer 20 judges, in the print job holding entrustment processing unit 20d, whether there are other printers entrusted with holding of the print job to which the acquisition request has not been sent. When it is judged that there are such other printers ("Yes" in step S520), the printer 20 shifts to step S510. When it is judged that there are no such other printers ("No" in step S520), the printer 20 shifts to step S522.

When the printer 20 shifts to step S522, the printer 20 transmits, in the print job holding entrustment processing unit 20d, a message indicating that the print job cannot be restored to the client terminal 10, which has transmitted the print job, via the data control unit 20b and the data communicating unit 20a and shifts to step S500.

Figure 9:
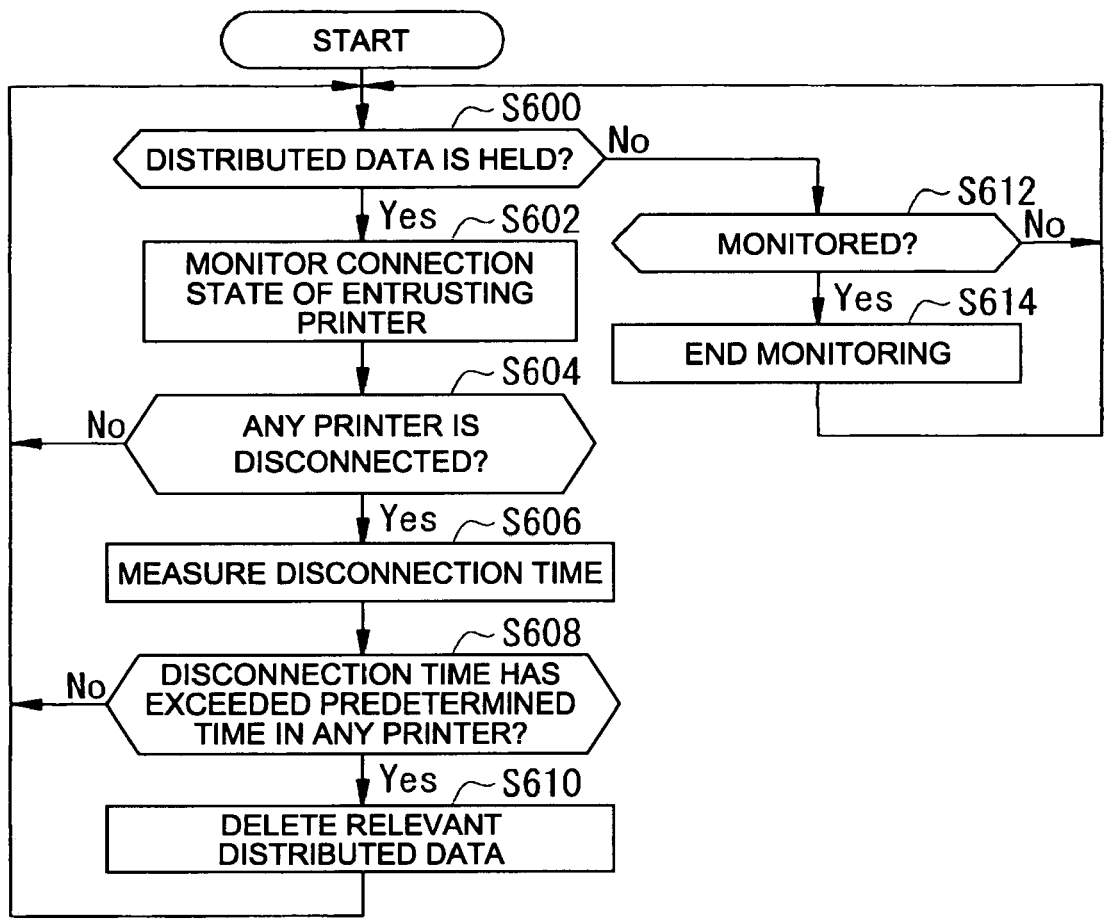
FIG. 9 is a flowchart of connection state checking processing in the printer 20.

Moreover, the printer 20 starts a predetermined program stored in a predetermined area of the ROM using the CPU and executes connection state check processing shown in a flowchart in FIG. 9 in accordance with the program FIG. 9 is a flowchart of the connection state check processing in the printer 20.

When the CPU executes the connection state check processing, as shown in FIG. 9, first, the printer 20 shifts to step S600.

In step S600, the printer 20 judges, in the connection state monitoring unit 20g, whether distributed data is held on the basis of the attribute information stored in the data storing unit 20c. When it is judged that distributed data is held ("Yes" in step S600), the printer 20 shifts to step S602. When it is judged that distributed data is not held ("No" in step S600), the printer 20 shifts to step S612.

When the printer 20 shifts to step S602, the printer 20 executes, in the connection state monitoring unit 20g, monitoring processing for a connection state of other printers 20 that entrust the printer 20 with holding of the distributed data and shifts to step S604.

In step S604, the printer 20 judges, in the connection state monitoring unit 20g, whether there is a printer disconnected from the network 30 among the other printers 20 that entrust the printer 20 with holding of the distributed data. When it is judged that there is a printer disconnected from the network 30 ("Yes" in step S604), the printer 20 shifts to step S606. When it is judged that there is no printer disconnected from the network 30 ("No" in step S604), the printer 20 shifts to step S600.

When the printer 20 shifts to step S606, the printer 20 performs, in the connection state monitoring unit 20g, measurement of a disconnection time using the timer and shifts to step S608.

In step S608, the printer 20 judges, the connection state monitoring unit 20g, whether there is a printer, a disconnection time of which has exceeded a predetermined time. When it is judged that there is such a printer ("Yes" in step S608), the printer 20 deletes relevant distributed data from the data storing unit 20c and shifts to step S600.

Figure 10:
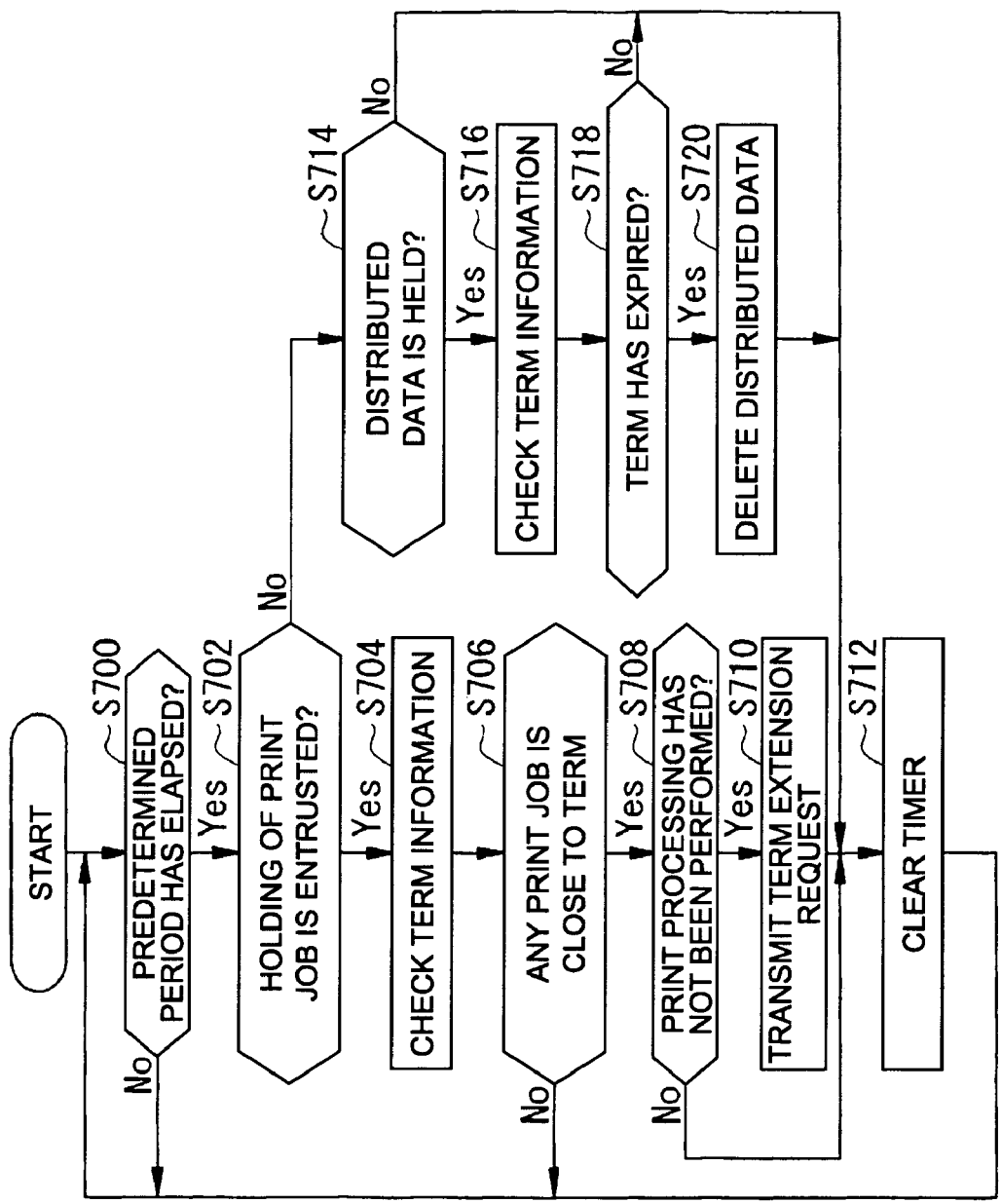
FIG. 10 is a flowchart of holding term management processing in the printer 20.

Moreover, the printer 20 starts a predetermined program stored in a predetermined area of the ROM using the CPU and executes holding term management processing shown in a flowchart in FIG. 10.

FIG. 10 is a flowchart of the holding term management processing in the printer 20.

When the CPU executes the holding term management processing, as shown in FIG. 10, first, the printer 20 shifts to step S700.

In step S700, the printer 20 judges, in the data control unit 20b, whether a predetermined period has elapsed on the basis of a value of the not-shown timer. When it is judged that the predetermined period has elapsed ("Yes" in step S700), the printer 20 shifts to step S702. When it is judged that the predetermined period has not elapsed ("No" in step S709), the printer 20 repeats the judgment processing until the predetermined period elapses.

When the printer 20 shifts to step S702, the printer 20 judges, in the data control unit 20b, whether holding of a print job is entrusted to another printer 20. When it is judged that holding of the print job is entrusted ("Yes" in step S700), the printer 20 shifts to step S704. When it is judged that holding of the print job is not entrusted ("No" in step S700), the printer 20 shifts to step S714.

When the printer 20 shifts to step S704, the printer 20 checks, in the data control unit 20b, a holding term included in attribute information corresponding to the print job, holding of which is entrusted, and shifts to step S706. Check of a holding term is processing for comparing the holding term and a present date and time.

In step S706, the printer 20 judges whether there is a printer, a holding term of which is close, on the basis of a result of check in step S704. When it is judged that there is such a printer ("Yes" in step S706), the printer 20 shifts to step S708. When it is judged that there is no such printer ("No" in step S706), the printer 20 shifts to step S712.

When the printer 20 shifts to step S708, the printer 20 judges, in the data control unit 20b, whether print processing for the print job, a holding term of which is close, has not been performed. When it is judged that the print processing has not been performed ("Yes" in step S708), the printer 20 shifts to step S710. When it is judged that the print processing has been performed ("No" in step S708), the printer 20 shifts to step S712.

When the printer 20 shifts to step S710, the printer 20 transmits, in the data control unit 20b, an extension request for the holding term to the printer 20 entrusted with holding of the print job via the data communicating unit 20a to request the printer 20 to extend the holding term by an extension period determined in advance and shifts to step S712.

In step S712, the printer 20 clears, in the data control unit 20b, a value of the time and shifts to step S700.

On the other hand, when it is judged in step S702 that holding of the print job is not entrusted and the printer 20 shifts to step S714, the printer 20 judges, in the data control unit 20b, whether distributed data are held. When it is judged that distributed data are held ("Yes" in step S714), the printer 20 shifts to step S716. When it is judged that distributed data are not held ("No" in step S714), the printer 20 shifts to step S712.

When the printer 20 shifts to step S716, the printer 20 checks, in the data control unit 20b, holding terms included in attribute information corresponding to the distributed data and shifts to step S718.

In step S718, the printer 20 judges, in the data control unit 20b, whether there is distributed data, a holding term of which has expired, on the basis of a result of the check in step S716.

When it is judged that there is such distributed data ("Yes" in step S718), the printer 20 shifts to step S720. When it is judged that there is no such distributed data ("No" in step S718), the printer 20 shifts to step S712.

When the printer 20 shifts to step S720, the printer 20 deletes, in the data control unit 20b, the distributed data, a holding term of which has expired, from the data storing unit 20c and shifts to step S712.

Figure 11:
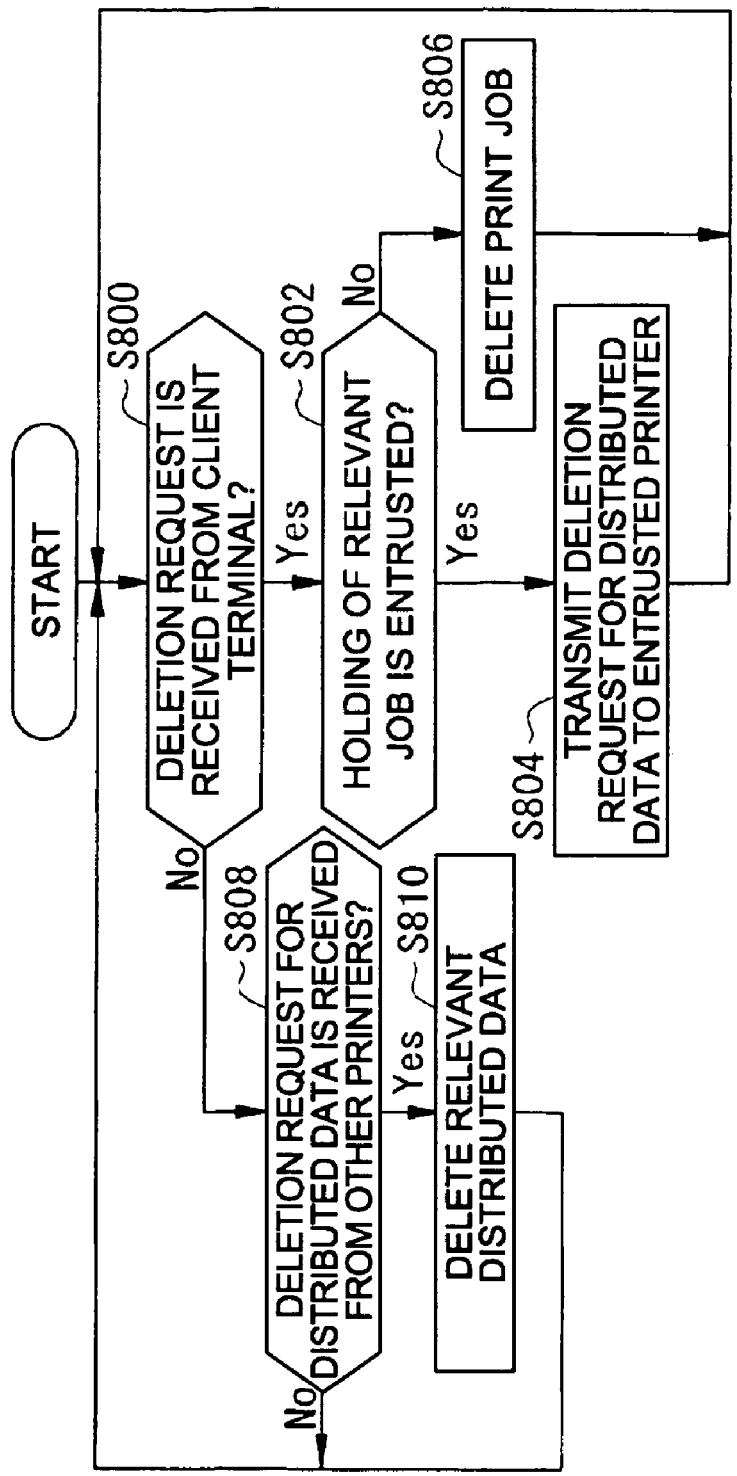
FIG. 11 is a flowchart of print job deletion processing in the printer 20.

Moreover, the printer 20 starts a predetermined program stored in a predetermined area of the ROM using the CPU and executes print job deletion processing shown in a flowchart in FIG. 11 in accordance with the program.

FIG. 11 is a flowchart of the print job deletion processing in the printer 20.

When the CPU executes the print job deletion processing, as shown in FIG. 11, first, the printer 20 shifts to step S800.

In step S800, the printer 20 judges, in the data control unit 20b, whether a deletion request for a print job is received from the client terminal 10 via the data communicating unit 20a. When it is judged that a deletion request for a print job is received ("Yes" in step S800), the printer 20 shifts to step S802. When it is judged that a deletion request for a print job is not received ("No" in step S800), the printer 20 shifts to step S808.

When the printer 20 shifts to step S802, the printer 20 judges, in the data control unit 20b, whether holding of ill the print job corresponding to the deletion request is entrusted to another printer 20. When it is judged that holding of the print job is entrusted ("Yes" in step S802), the printer 20 shifts to step S804. When it is judged that holding of the print job is not entrusted ("No" in step S802), the printer 20 shifts to step S806.

When the printer 20 shifts to step S804, the printer 20 transmits, in the data control unit 20b, a deletion request for the distributed data to the printer 20 entrusted with holding of the print data that holds distributed data of the print job corresponding to the deletion request via the data communicating unit 20a and shifts to step S806.

On the other hand, when the printer 20 shifts to step S806, the printer 20 deletes, in the data control unit 20b, the print job corresponding to the deletion request from the data storing unit 20 together with attribute information thereof and shifts to step S800.

When it is judged in step S800 that a deletion request is not received from the client terminal 10 and the printer 20 shifts to step S808, the printer 20 judges, in the data control unit 20b, whether a deletion request for distributed data is received from the another printer 20 via the data communicating unit 20a. When it is judged that a deletion request for distributed data is received ("Yes" in step S808), the printer 20 shifts to step S810. When it is judged that a deletion request for distributed data is not received ("No" in step S808), the printer 20 shifts to step S800.

When the printer 20 shifts to step S810, the printer 20 deletes, in the data control unit 20b, distributed data corresponding to the deletion request for distributed data from the data storing unit 20c together with attribute information thereof and shifts to step S800.

Figure 12:
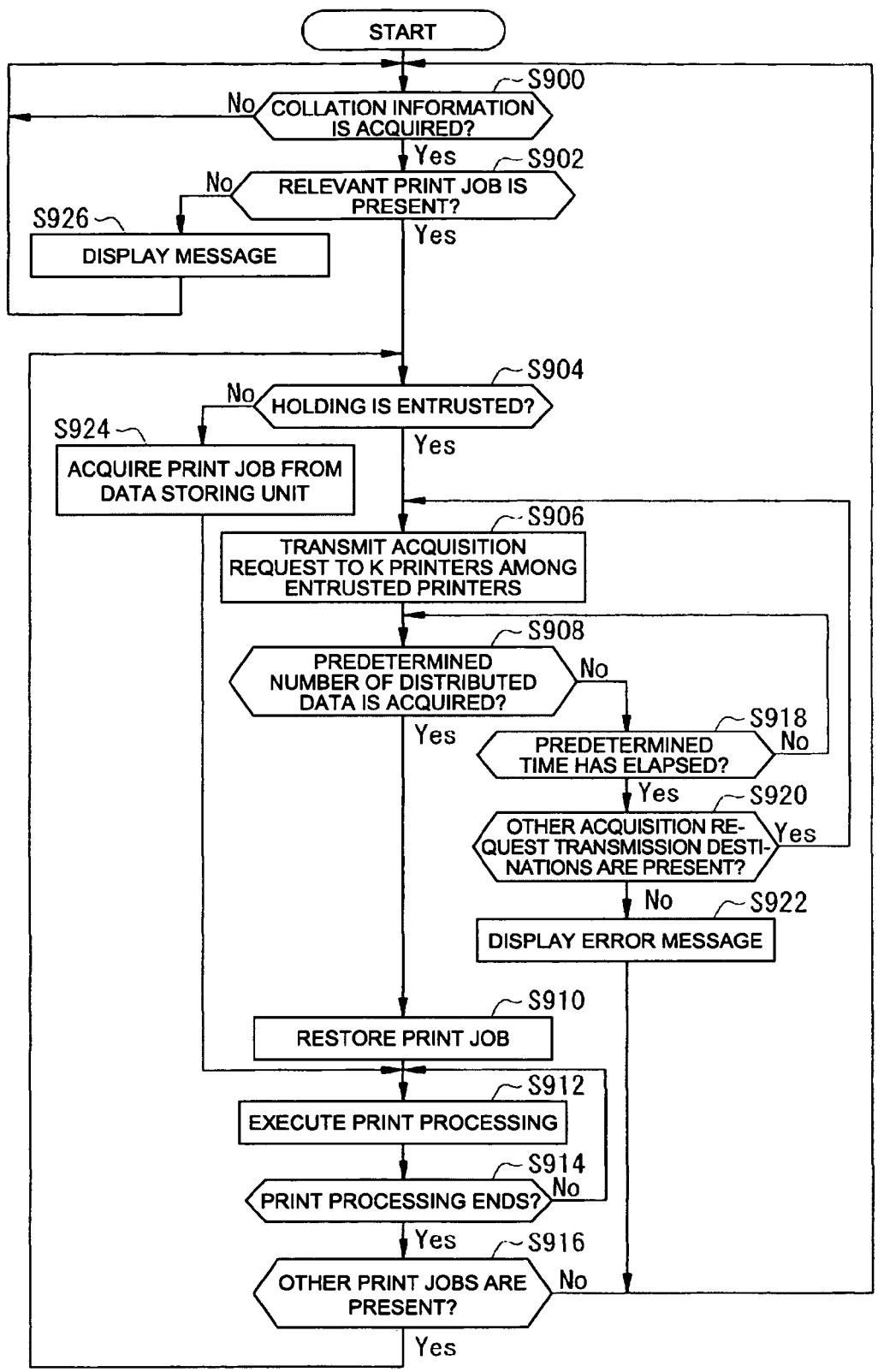
FIG. 12 is a flowchart of print processing in the printer 20.

Moreover, the printer 20 starts a predetermined program stored in a predetermined area of the ROM using the CPU and executes print processing shown in a flowchart in FIG. 12 in accordance with the program.

FIG. 12 is a flowchart of the print processing in the printer 20.

When the CPU executes the print processing, as shown in FIG. 12, first, the printer 20 shifts to step S900.

In step S900, the printer 20 judges, in the data control unit 20b, whether collation information is acquired via the collation information acquiring unit 20h. When it is judged that collation information is acquired ("Yes" in step S900), the printer 20 shifts to step S902. When it is judged that collation information is not acquired ("No" in step S900), the printer 20 repeats the judgment processing.

When the printer 20 shifts to step S902, the printer 20 judges, in the data control unit 20b, whether there is a print job corresponding to the collation information from the collation information stored in the data storing unit 20c. When it is judged that there is a print job corresponding to the collation information ("Yes" in step S902), the printer 20 shifts to step S904. When it is judged that there is no print job corresponding to the collation information ("No" in step S902), the printer 20 shifts to step S922.

When the printer 20 shifts to step S904, the printer 20 judges, in the data control unit 20b, whether the printer 20 entrusts holding of the print job. When it is judged that the printer 20 entrusts holding of the print job ("Yes" in step S904), the printer 20 shifts to step S906. When it is judged that the printer 20 does not entrust holding of the print job ("No" in step S904), the printer 20 shifts to step S920.

When the printer 20 shifts to step S906, the printer 20 transmits, in the data control unit 20b, an acquisition request for distributed data to K printers 20 among K printers 20 entrusted with holding of the print job via the data communicating unit 20a and shifts to step S908.

In step S908, the printer 20 judges, in the data control unit 20b, whether K distributed data are acquired. When it is judged that K distributed data are acquired ("Yes" in step S908), the printer 20 shifts to step S910. When it is judged that K distributed data are not acquired ("No" in step S908), the printer 20 shifts to step S918.

When the printer shifts to step S910, the printer 20 restores, in the print job holding entrustment processing unit 20d, the original print job from the K distributed data acquired in step S908 according to a restoration instruction from the data control unit 20b and shifts to step S912.

In step S912, the printer 20 executes, in the print processing unit 20i, print processing for the print job according to the print job and a print instruction from the data control unit 20b and shifts to step S914.

In step S914, the printer 20 judges, in the data control unit 20b, whether the print processing ends. When it is judged that the print processing ends ("Yes" in step S914), the printer 20 shifts to step S916. When it is judged that the print processing does not end ("No" in step S914), the printer 20 shifts to step S912.

When the printer 20 shifts to step S916, the printer 20 judges, in the data control unit 20b, whether there is a print job corresponding to the collation information. When it is judged that there is a print job corresponding to the collation information ("Yes" in step S916), the printer 20 shifts to step S904. When it is judged that there is no print job corresponding to the collation information ("No" in step S916), the printer 20 shifts to step S900.

On the other hand, when it is judged in step S908 that K distributed data are not acquired and the printer 20 shifts to step S918, the printer judges, in the data control unit 20b, whether a predetermined time has elapsed on the basis of an elapsed time measured by the not-shown timer. When it is judged that the predetermined time has elapsed ("Yes" in step S918), the printer 20 shifts to step S920. When it is judged that the predetermined time has not elapsed ("No" in step S918), the printer shifts to step S908.

When the printer shifts to step S920, the printer 20 judges, in the data control unit 20b, whether there is the printer 20, which can be designated as a printer from which distributed data is acquired, other than the printers 20 that have not sent distributed data. When it is judged that there is such a printer 20 ("Yes" in step S920), the printer 20 shifts to step S906. When it is judged that there is no such a printer 20 ("No" in step S920), the printer 20 shifts to step S922.

When the printer 20 shifts to step S922, the printer 20 displays an error message indicating that print processing is impossible on the not-shown display unit and shifts to step S900.

On the other hand, when it is judged in step S904 that holding of a print job corresponding to the collation information is not entrusted and the printer 20 shifts to step S924, the printer 20 acquires, in the data control unit 20b, the print job from the data storing unit 20c and shifts to step S912.

When it is judged in step S902 that there is not print job corresponding to the collation information and the printer 20 shifts to step S926, the printer 20 displays, in the data storing unit 20b, a message indicating that there is no print job corresponding to the collation information on the not-shown display unit and shifts to step S900.

Operations in this embodiment will be explained with reference to FIGS. 13 to 15. FIG. 13A is a diagram showing an example of a print job attribute information management table in a first printer 20A. FIG. 13B is a diagram showing an example of a holding form of print data included in a print job. FIG. 14 is a table showing an example of operation state information. FIG. 15 is a diagram showing an example of a print job attribute information management table in a second printer 20B.

When a print job is generated in the client terminal 10 (step S104) and the print job generated is transmitted to the first printer 20A (step S106), the first printer 20A receives the print job via the data communicating unit 20a and the data control unit 20b ("Yes" in step S200). The print job received includes information on a user (a printing person), print setting information such as a sheet size, color/monochrome printing, and duplex/simplex printing, print data such as document data and image data, and the like. The first printer 20A gives, in the data control unit 20b, a reception number to the print job (step S202). First attribute information is generated from the information on the user, the print setting information, and the like. As shown in FIG. 13A, the first printer 20A associates the first attribute information with the reception number and additionally stores the first attribute information in a first attribute information table in the data storing unit 20c (step S204).

The first printer 20A detects a data size of the received print ob (step S206). The data size and a remaining capacity of a print data storing area of the data storing unit 20c are compared. When there is room in the capacity of the data storing unit 20 and the print job can be stored ("No" in step S208), as shown in FIG. 13B, the first printer 20A stores the print data included in the print job in the data storing unit 20c in association with the reception number (step S220). Printers A to E in FIG. 13A indicate first to fifth printers 20A to 20E.

On the other hand, when the storage capacity of the data storing unit 20c is insufficient and the print job cannot be stored ("Yes" in step S208), the first printer 20A executes, in the print job holding entrustment processing unit 20d, print job holding entrustment processing for entrusting the another printer 20 with holding of the print job (step S210)

When the print job holding entrustment processing is started, first, the first printer 20A transmits, in the operation state information acquiring unit 20e, an acquisition request for operation state information to the second to the fifth printers 20B to 20E connected to the network 30 (step S300). The first printer 20A transmits information for requesting responses to the respective printers 20 ten times as the operation state information acquisition request. The first printer 20A receives responses from the second to the fifth printers 20B to 20E to the operation state information acquisition request transmitted ten times as operation state information (step S302). When there is not response for a certain length of time or there is no complete response (communication interruption, etc.), the first printer 20A judges that there is no effective response. Besides, the first printer 20A transmits information for requesting information indicating a remaining storage capacity and information indicating a state of occurrence of an error to the respective printers 20 as an operation state information acquisition request and acquires information indicating a remaining storage capacity and information indicating a state of an error of the respective printers 20.

When the acquisition of operation state information is completed, in the print job holding entrustment processing unit 20d, finally, a table indicating a relation between the number of times of check (ten times in this explanation) and the number of times of acquisition of effective responses concerning the first to the fifth printers 20B to 20E is generated as shown in FIG. 14. The first printer 20A evaluates, in the print job holding entrustment processing unit 20d, states of the second to the fifth printers 20B to 20E from the table, the information indicating a remaining storage capacity, and the information indicating a state of an error (step S304). The first printer 20A selects three printers that operate normally and have free spaces in storage capacities necessary for storing a print job, holding of which is entrusted, among the second to the fifth printers 20B to 20E, which are candidates to which holding of a print job is entrusted, in order from one with highest evaluation of the number of times acquisition of effective responses as printers entrusted with holding of a print job that cannot be held in the first printer 20A due to an insufficient capacity (step S306). In the table shown in FIG. 14, the third printer 20C has highest evaluation with ten times of acquisition of effective responses, the second and the fourth printers 20B and 20D has next highest evaluation with nine times of acquisition of effective responses, and the fifth printer 20E has lowest evaluation with five times of acquisition of effective responses. Thus, when free spaces in storage capacities of the second to the fifth printers 20B to 20E are secured, the second to the fourth printers 20B to 20D are selected as printers entrusted with holding of a print job.

When printers entrusted with holding of a print job are selected, the first printer 20A generates, in the print job holding entrustment processing unit 20d, three distributed data on the basis of the print job, holding of which is entrusted, using the threshold secret sharing scheme (step S308). The first printer 20A generates the three distributed data such that the original print job can be restored from two distributed data among the three distributed data. In this explanation, distributed data are generated using the number of restorable data −1=(2−1), that is, a primary polynomial "y=ax+b" on the basis of the "method of Shamir" that is a type of the threshold secret sharing scheme.

An inclination "a" in the polynomial is arbitrary (secretly) determined in the first printer 20A that generates distributed data (entrusts holding of a print job). The inclination "a" is set to 1 in this explanation.

A y intercept "b" is a data sequence, that is, print job data that a user desires to conceal. For convenience of explanation, the y intercept "b" is set to, for example, data with the 32 bit length "00000000000000000000000000000001". The data with the 32 bit length is represented by a numerical value "1" below.

When the inclination "a" and the y intercept "b" set are substituted in the polynomial, the following expression 1 is obtained.

$$Y=x+1 \qquad 1$$

When the polynomial of Expression 1 is obtained, the first printer 20A generates, in the print job holding entrustment processing unit 20d, distributed data to be sent to the second to the fourth printers 20B to 20D using Expression 1.

"1" is substituted as x in Expression 1 to calculate y as "y=1+1=2". (x,y)=(1,2) is set as distributed data to be sent to the second printer 20B. Similarly, "2" and "3" are substituted as x in Expression 1 to calculate y as "y=2+1=3" and "y=3+1=4". (x,y)=(2,3) and (x,y)=(3,4) are set as distributed data to be sent to the third and the fourth printers 20C and 20D.

When the distributed data to be sent to the second to the fourth printers 20B to 20D are generated, the first printer 20A adds second attribute information including user information, print setting information, information on the first printer 20A, which entrusts holding of the print job, a holding term of distributed data, and a reception number in the printer that entrusts holding of the print job to each of the three distributed data (step S310). The first printer 20A transmits the distributed data to the second to the fourth printers 20B to 20D that are printers entrusted with holding of the print job (step S312).

When the transmission of the distributed data is completed, the first printer 20A adds, in the print job holding entrustment processing unit 20d, the information on the second to the fourth printers 20B to 20D entrusted with holding of the print job and the holding term information to the first attribute information corresponding to the print job, holding of which is entrusted (step S314).

On the other hand, when the second printer 20B receives the distributed data (2,3) from the first printer 20A (step S400), the second printer 20B stores, in the print job substitute holding processing unit 20f, the second attribute information added to the distributed data received, the distributed data, and a reception number in the data storing unit 20c in association with one another (step S404)

As shown in FIG. 15, the second attribute data is stored in the data storing unit 20c as table data including a reception number, an attribute item, and an attribute value.

The distributed data is stored in the data storing unit 20c in association with the reception number in the same manner as the print data shown in FIG. 13B.

As described above, in the second printer 20B entrusted with holding of the print job, the distributed data (2,3) is held rather than the print job itself. Since an inclination of Expression 1 is not found only from the distributed data (2,3), it is impossible to restore the print job concealed as the y intercept. Therefore, even if only the distributed data alone is leaked, since the original print job cannot be restored, a high security ability against information leakage and the like is realized.

The substitute holding processing for distributed data is the same in the third and the fourth printers 20C and 20D. Thus, explanations of the substitute holding processing in the third and the fourth printers 20C and 20D are omitted.

The first printer 20A checks holding terms of the distributed data of the print job, holding of which is entrusted, (hereinafter referred to as print job P) for each predetermined period (step S704). When there is distributed data, a holding term of which is close, the first printer 20A transmits an extension request for the holding term to the first to the fourth printers 20B to 20D (step S710).

Consequently, the second to the fourth printers 20B to 20D perform processing for rewriting the holding terms of the respective distributed data to new terms. Therefore, the printers 20 entrusted with holding of the print job hold the distributed data until the rewritten terms.

The first to the fifth printers 20A to 20E checks holding terms of distributed data, holding of which is entrusted by the other printers 20, in each predetermined period (step S716). When there is distributed data, a holding term of which has expired, the first to the fifth printers 20A to 20E perform processing for deleting the distributed data (step S720).

For example, in the first printer 20A, when distributed data, a holding term of which has expired, is deleted and a free space in a storage capacity capable holding the print job P is formed in the data storing unit 20c ("Yes" in step S508), the first printer 20A transmits an acquisition request for distributed data to two of the second to fourth printers 20B to 20D in which the distributed data of the print job P are stored (step S510). In this explanation, it is assumed that the first printer 20A transmits an acquisition request to the second and the third printers 20B and 20C and acquires distributed data (1,2) and (2,3)("Yes" in step S512).

When the first printer 20A acquires the distributed data, the first printer 20A executes, in the print job holding entrustment processing unit 20d, restoration processing for the print job (step S514).

The restoration of the print job is performed by using a Lagrange interpolation formula of Expression 2 below to calculate Expression 1 using the distributed data (1,2) and (2,3).

$$p(x) = \sum_{l=1}^{\eta} \left( y_i \prod_{\substack{j=1 \\ i \neq j}}^{\eta} \frac{x - x_j}{x_i - x_j} \right) \quad (2)$$

When the distributed data (1,2) and (2,3) are substituted in Expression 2, "P(x)=(y1×(x−x2)÷(x1−x2))+(y2×(x−x1)÷(x2−x1))=(2×(x−2)÷(−1))+(3×(x−1)÷1)=(−2x+4)+(3x−3)=x+1" is obtained. Thus, it is possible to derive Expression 1.

Consequently, since the print job is set as the y intercept, "1" is restored as the print job. When the print job is restored in this way, the first printer 20A stores, in the print job holding entrustment processing unit 20d, the restored print job in the data storing unit 20c in association with the reception number (step S516).

On the other hand, when the distributed data is held, the first to the fifth printers 20A to 20E monitor, in the connection state monitoring unit 20g, a state of connection to the network 30 of the printers 20 that entrust holding of the distributed data (step S602). The first to the fifth printers 20A to 20E delete the distributed data from the printer 20, which is disconnected for a predetermined time or more, from the data storing unit 20c (step S610). For example, in the following explanation, the fourth printer 20D monitors a connection state of the first printer 20A using the connection state monitoring unit 20g.

The monitoring of a connection state is performed by transmitting a response request to the first printer 20A, which is an object of the monitoring, at predetermined time intervals and monitoring presence or absence of a response to the response request. When there is no response from the first printer 20A for the predetermined time or more and it is judged that the first printer 20A is disconnected from the network 30 ("Yes" in step S608), the fourth printer 20D deletes the distributed data (3,4), holding of which is entrusted by the first printer 20A, from the data storing unit 20c together with the second attribute information (step S610).

In each of the first to the fifth printers 20A to 20E, even when collation information from the user is acquired and print processing for a print job corresponding to the collation information is executed, when the print job is held by the other printers ("Yes" in step S904), the printer acquires the distributed data from two of three other printers ("Yes" in step S908), restores the original print job from the distributed data acquired (step S910), and executes print processing (step S912) as described above.

In this way, even when each of the first to the fifth printers 20A to 20E cannot hold print jobs sent to the printer due to an insufficient storage capacity, it is possible to distribute the print job to the other printers 20 connected via the network 30 as plural distributed data and cause the other printers 20 to hold the distributed data. Consequently, it is possible to efficiently use storage capacities of the data storing units 20c of the first to the fifth printers 20A to 20E. Each of the printers 20 can entrust the other printers 20 with holding of a print job with high security.

As described above, it is possible to restore an original print job from distributed data held by two printers among three printers that hold distributed data. Thus, even if one of the three printers is disconnected from a network due to some trouble, if the other two printers operate normally, it is possible to restore the original print job. In other words, it is possible to give strong resistance against occurrence of a trouble or the like to the printers by giving redundancy to holding of a print job.

When the problem of the insufficient storage capacity is solved and each of the first to the fifth printers 20A to 20E can store the print job, retention of which is entrusted to the other printers, the printer is capable of acquiring the distributed data held by any two printers of the three printers that hold the distributed data, restoring the original print job, and storing the print job in the data storing unit 20c of the printer again. Since this makes it easy to hold a print job sent to each of the printers 20 in each of the printers 20, in performing print processing, it is possible to reduce probability of restoration processing for the print job. This makes it possible to execute print processing at high speed.

Each of the first to the fifth printers 20A to 20E is capable of monitoring, when the printer holds distributed data, a connection state of a printer that entrusts retention of the distributed data and, when the printer is disconnected from the network 30 for time exceeding a predetermined time, deleting the distributed data from the data storing unit 20c. Consequently, since it is possible to prevent each of the printers 20 from continuing to hold unnecessary distributed data for a long time, it is possible to efficiently use the storage capacity of the data storing unit 20c.

If there are printers having the functions of the first to the fifth printers 20A to 20E, it is possible to execute the respective kinds of processing described above and other management apparatuses such as a printer server are unnecessary. Thus, in particular, in a large system, it is possible to significantly reduce cost.

In the embodiments, the processing for holding a print job in the data control unit 20b and the data storing unit 20c corresponds to the print job holding unit in the third or the eighth aspect of the invention. The print job holding entrustment processing 20d corresponds to the print job holding entrusting unit in the third or the eighth aspect of the invention. The print job substitute holding processing unit 20f corresponds to the print job substitute holding unit in the third or the eighth aspect of the invention. The processing for transmitting an operation state information acquisition request by the operation state information acquiring unit 20e and the print job holding entrustment processing unit 20d corresponds to the operation state information acquisition request transmitting unit in the third or the eighth aspect of the invention. The processing for transmitting an acquisition request for distributed data via the data control unit 20b and the data communicating unit 20a corresponds to the acquisition request transmitting unit in the third or the eighth aspect of the invention. The connection state monitoring unit 20g corresponds to the connection state monitoring unit in the third or the eighth aspect of the invention. The processing for restoring a print job in the print job holding entrustment processing unit 20d corresponds to the print job restoring unit in the third or the eighth aspect of the invention. The print processing unit 20i corresponds to the print processing unit in the third or the eighth aspect of the invention.

In the embodiments, steps S200 to S208 and step S220 correspond to the print job holding step in the ninth or the eleventh aspect of the invention. Step S210 corresponds to the print job holding entrusting step in the fifth or the seventh aspect of the invention. Step S300 corresponds to the operation state information acquisition request transmitting step in the ninth or the eleventh aspect of the invention. Steps S400 to S404 correspond to the print job substitute holding step in the ninth or the eleventh aspect of the invention. Steps S406 to S414 correspond to the entrusted print job transmitting step in the ninth or the eleventh aspect of the invention. Steps S600 to S606 correspond to the connection state monitoring step in the ninth or the eleventh aspect of the invention. Steps S608 to S610 correspond to the print job deleting step in the ninth or the eleventh aspect of the invention.

Figure 17:
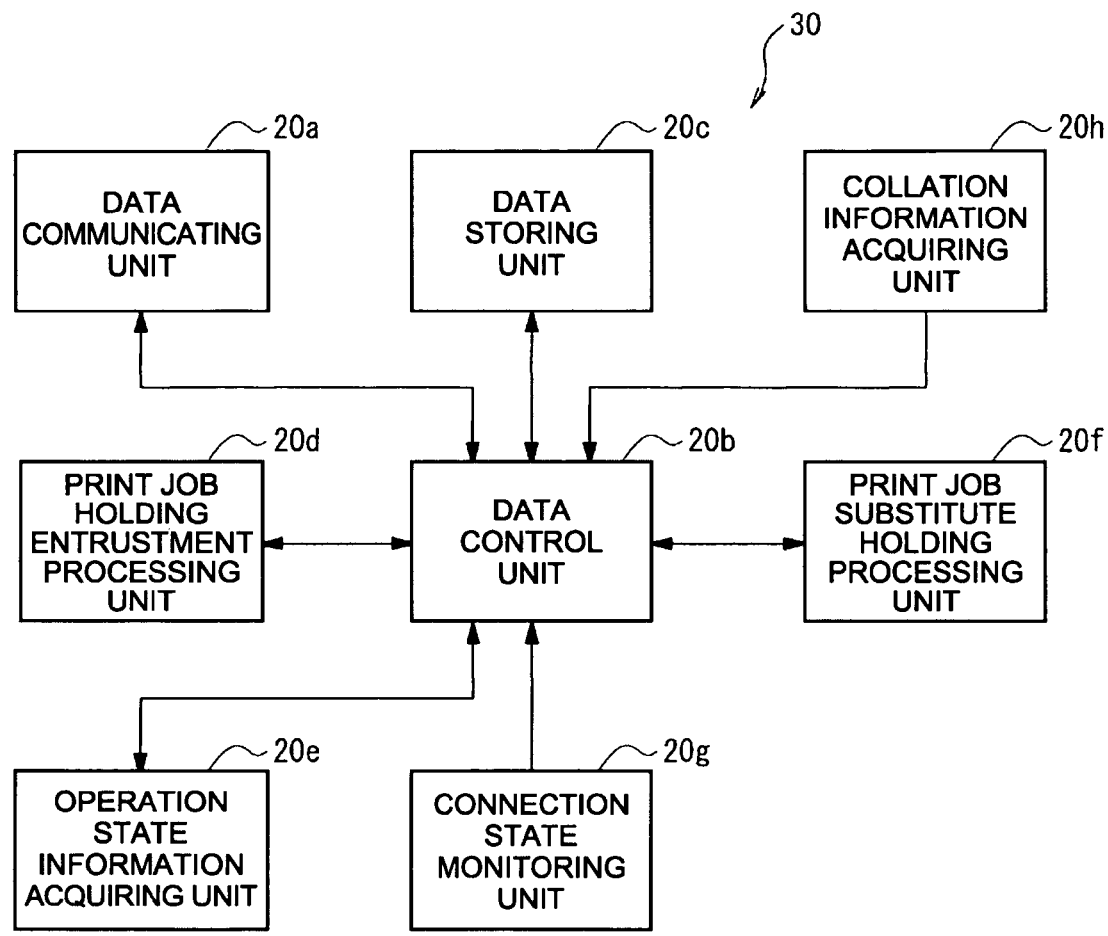
FIG. 17 is a block diagram showing a functional constitution of a print job holding apparatus 30.

In the embodiments, the printer 20 has the function of entrusting holding of a print job (the print job holding entrustment processing unit 20d and the operation state information acquiring unit 20e), the function of substitutively holding the print job (distributed data) (the print job substitute holding processing unit 20f), the function of managing the print job held (the connection state monitoring unit 20g), and the like. However, the invention is not limited to this. It is also possible that, as shown in FIG. 17, these functions are given to an information processing terminal such as a PC to constitute a print job holding apparatus 30 and the print job holding apparatus 30 is associated with a publicly-known printer having only a usual print processing function or plural publicly-known printers to establish a functional constitution equivalent to the printers 20 in the embodiments and cause the print job holding apparatus 30 to perform the processing for holding a print job and the processing for managing a print job in the embodiments instead of the printer 20.

When such a constitution is adopted, the processing for holding a print job in the data control unit 20b and the data storing unit 20c corresponds to the print job holding unit in any one of the first, the second, and the fourth aspects of the invention. The print job holding entrustment processing unit 20d corresponds to the print job holding entrusting unit in any one of the first, the second, and the fourth aspects of the invention. The print job substitute holding processing unit 20f corresponds to the print job substitute holding unit in any one of the first, the second, and the fourth aspects of the invention. The processing for transmitting an operation state information acquisition request by the operation state information acquiring unit 20e and the print job holding entrustment processing unit 20d corresponds to the operation state information acquisition request transmitting unit in any one of the first, the second, and the fourth aspects of the invention. The processing for transmitting an acquisition request for distributed data via the data control unit 20b and the data communicating unit 20a corresponds to the acquisition request transmitting unit in any one of the first, the second, and the fourth aspects of the invention. The connection state monitoring unit 20g corresponds to the connection state monitoring unit in any one of the first, the second, and the fourth aspects of the invention. The processing for restoring a print job in the print job holding entrustment processing unit 20d corresponds to the print job restoring unit in any one of the first, the second, and the fourth aspects of the invention.

Steps S200 to S208 and step S220 correspond to the print job holding step in the fifth or the seventh aspect of the invention. Step S210 corresponds to the print job holding entrusting step in the fifth or the seventh aspect of the invention. Step S300 corresponds to the operation state information acquisition request transmitting step in the fifth or the seventh aspect of the invention. Steps S400 to S404 correspond to the print job substitute holding step in the fifth or the seventh aspect of the invention. Steps S406 to S414 correspond to the entrusted print job transmitting step in the fifth or the seventh aspect of the invention. Steps S600 to S606 correspond to the connection state monitoring step in the fifth or the seventh aspect of the invention. Steps S608 to S610 correspond to the print job deleting step in the fifth or the seventh aspect of the invention.

In the example explained in the embodiments, when there is no free space in a capacity of a printer and a print job sent to the printer is distributed to other printers to cause the other printers to hold the print job, in the processing of the flowchart in FIG. 8, a remaining storage capacity is checked in each predetermined period and, when a free space necessary for the print job, retention of which is entrusted to the other printers, is formed in the storage capacity, the printer acquires the print job from the other printers. However, the invention is not limited to this example. It is also possible that a free space is checked at other timing to acquire the print job sent to the printer and held by the other printers. For example, it is also possible that, after deleting the print job in steps S806 and S810 in the flowchart in FIG. 11, a remaining storage capacity is checked and, when a free space necessary for the print job distributed to and held by the other printers is formed by the deletion processing, the print job is acquired from the other printers.

In the example explained in the embodiments, in the determination processing by the printers 20 entrusted with retention of a print job, information on the number of times of acquisition of effective responses to a response request, information indicating a remaining storage capacity, and information indicating a state of an error of the printers 20 that are candidates of printers entrusted with holding of a print job are acquired as operation state information, three printers that operate normally and have free spaces in storage capacities necessary for storing a print job, holding of which is entrusted, among the printers 20, which are candidates to which holding of a print job is entrusted, are determined in order from one with highest evaluation of the number of times acquisition of effective responses as printers entrusted with holding of the print job. However, the invention is not limited to this example. It is also possible that, as shown in FIGS. 18A to 18C, from the printers 20 (or the print job holding apparatuses 30) that are candidates to which holding of a print job is entrusted, information on models and storing methods of hard disks (HDDs) provided in the printers 20, information on encryption algorithms used for communication of print job information by the printers 20, and information indicating safety of the printers 20 (constitution information on a network) are acquired instead of the information on the number of times of acquisition of effective responses as operation state information. Then, as shown in FIGS. 19A to 19D, for example, the printer 20 having a high total value of evaluation points is preferentially determined as a printer entrusted with holding of the print job on the basis of a data table in which numerical value (evaluation point) information for evaluating effectiveness of printers as a printer entrusted with holding of a pint job set in advance with respect to the respective pieces of information acquired is registered. In such a case, the printers 20 (or the print job holding apparatuses 30) hold a data table in which information on encryption algorithms of encrypting and communicating units (not shown), information on the data storing units 20*c* (storage devices (HDDs)) (models, etc.), information on storing methods of data (information on RAID controllers, etc.), information indicating safety of the apparatuses, and the like of the apparatuses are registered. The printers 20 (or the print job holding apparatuses 30) also hold a data table in which information on numerical values (evaluation points) for evaluating effectiveness for these pieces of information (the information desirably includes all kinds of information to be evaluated) is registered. The printers 20 (or the print job holding apparatuses 30) read out these pieces of information in response to an acquisition request for operation state information from another printer 20 and transmit the information to the printer 20 that requests acquisition of the information.

Specific operations will be explained on the basis of FIGS. 18 and 19. It is assumed that, for example, there are the printers 20A and 20B as the printers 20 that are candidates to which holding of a print job is entrusted, there is the printer 20C as the printer 20 that entrusts holding of the print job, and the printers 20A, 20B, and 20C are connected via a network to be capable of performing data communication with one another. When the printer 20C cannot hold a print job sent to the printer 20C, first, the printer 20C acquires operation state information shown in FIG. 18A from the printer 20A and, on the other hand, acquires operation state information shown in FIG. 18B from the printer 20B. Operation state information of the printer 20C has content shown in FIG. 18C. The printer 20C calculates an evaluation point of the printer 20A on the basis of the operation state information shown in FIG. 18A and evaluation points for respective pieces of information shown in FIGS. 19A to 19C. Concerning the printer 20A, a model of an HDD is HDD1 (evaluation point 3), a storing method is FAT (evaluation point 0), an encryption algorithm is DES (evaluation point 1), and safety of a printer is level 1 (evaluation point 1). Thus, a total point of the evaluation points for the printer 20A is "3+0+1+1=5". The printer 20C calculates an evaluation point of the printer 20B on the basis of the operation state information shown in FIG. 18B and the evaluation points for the respective pieces of information shown in FIGS. 19A to 19C. Concerning the printer 20B, a model of an HDD is HDD2 (evaluation point 10), a storing method is EXT3 (evaluation point 4) or RAID-5 (evaluation point 2), an encryption algorithm is DES (evaluation point 1), 3-DES (evaluation point 3), or ES (evaluation point 5), and safety of a printer is level 3 (evaluation point 10). Thus, when a total point for the printer 20B is calculated on the basis of a combination of respective highest evaluation points, the total point is "10+4+5+10=29". Therefore, since the evaluation total point "29" of the printer 20B is higher than the evaluation total point "5" of the printer 20A, the printer 20C determines the printer 20B with the higher total value of the evaluation points as a printer entrusted with holding of the print job.

As described above, when the printer 20 determines a printer entrusted with holding of a print job using the operation state information shown in FIGS. 18A to 18C and the evaluation points shown in FIGS. 19A to 19D, the processing for holding a print job in the data control unit 20*b* and the data storing unit 20*c* corresponds to the print job holding unit in the third or the eighth aspect of the invention. The print job holding entrustment processing unit 20*d* corresponds to the print job holding entrusting unit in the third or the eighth aspect of the invention. The print job substitute holding processing unit 20*f* corresponds to the print job substitute holding unit in the third or the eighth aspect of the invention. The processing for transmitting an operation state information acquisition request by the operation state information acquiring unit 20*e* and the print job holding entrustment processing unit 20*d* corresponds to the operation state information acquisition request transmitting unit in the third or the eighth aspect of the invention. The processing for transmitting an acquisition request for distributed data via the data control unit 20*b* and the data communicating unit 20*a* corresponds to the acquisition request transmitting unit in the third or the eighth aspect of the invention. The connection state monitoring unit 20*g* corresponds to the connection state monitoring unit in the third or the eighth aspect of the invention. The processing for restoring a print job in the print job holding entrustment processing unit 20*d* corresponds to the print job restoring unit in the third or the eighth aspect of the invention. The print processing unit 20*i* corresponds to the print processing unit in the third or the eighth aspect of the invention.

On the other hand, when the print job holding apparatus 30 determines a printer entrusted with holding of a print job using the operation state information shown in FIGS. 18A to 18C and the evaluation points shown in FIGS. 19A to 19D instead of the printer 20, the processing for holding a print job in the data control unit 20*b* and the data storing unit 20*c* corresponds to the print job holding unit in any one of the first, the second, and the fourth aspects of the invention. The print job holding entrustment processing unit 20*d* corresponds to the print job holding entrusting unit in any one of the first, the second, and the fourth aspects of the invention. The print job substitute holding processing unit 20*f* corresponds to the print job substitute holding unit in any one of the first, the second, and the fourth aspects of the invention. The processing for transmitting an operation state information acquisition request by the operation state information acquiring unit 20*e* and the print job holding entrustment processing unit 20*d* corresponds to the operation state information acquisition request transmitting unit in any one of the first, the second, and the fourth aspects of the invention. The processing for transmitting an acquisition request for distributed data via the data control unit 20*b* and the data communicating unit 20*a* corresponds to the acquisition request transmitting unit in any one of the first, the second, and the fourth aspects of the invention. The connection state monitoring unit 20*g* corresponds to the connection state monitoring unit in any one of the first, the second, and the fourth aspects of the invention. The processing for restoring a print job in the print job holding entrustment processing unit 20*d* corresponds to the print job restoring unit in any one of the first, the second, and the fourth aspects of the invention.

Figure 16:
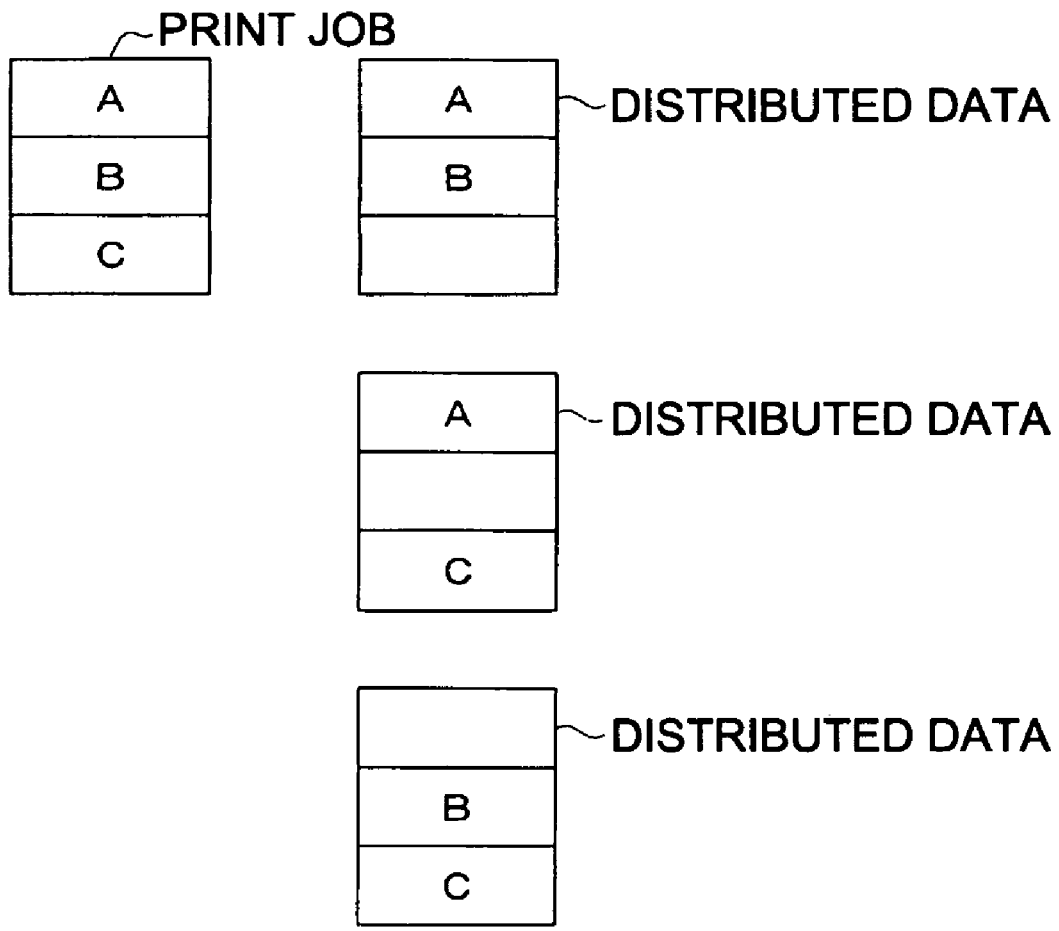
FIG. 16 is a diagram showing an example of creation of distributed data.

In the embodiments, when the printer 20 entrusts other printers with holding of a print job, the printer 20 generates distributed data using the threshold secret sharing scheme. However, the invention is not limited to this and other method may be used. For example, as shown in FIG. 16, a method of dividing a print job into three data "A", "B", and "C" and generating three distributed data, namely, distributed data having the data "A" and "B", distributed data having the data "A" and "C", and distributed data having the data "B" and "C". In other words, in the example in FIG. 16, the respective distributed data are generated such that the distributed data necessarily have data not overlapping the other distributed data. Thus, it is possible to restore the original print job from any two distributed data of the three distributed data.

In the embodiments, when the printer 20 entrusts other printers with holding of a print job, the printer 20 generates plural distributed data using the threshold secret sharing scheme and has the plural other printers 20 hold the plural distributed data, separately. However, the invention is not limited to this. The printer 20 may have another printer 20 hold the print job itself.

In the embodiments, the printer 20 may encrypt distributed data and, then, hold the distributed data in the data storing units 20c of the other printers 20. This makes it possible to further improve security.

In the explanations of the embodiments, in executing the respective kinds of processing shown in the flowcharts in FIGS. 4 to 12, the printer 20 executes the control programs stored in the ROM in advance. However, the invention is not limited to this. The printer 20 may read a program designating procedures for the processing in the RAM from a storage medium having the program stored therein.

The storage medium is a semiconductor storage medium such as a RAM or a ROM, a magnetic storage medium such as an FD or an HD, an optical reading storage medium such as a CD, a CDV, an LD, or a DVD, or a magnetic/optical reading storage medium such as an MO. The storage medium may be any recording medium as long as the storage medium is readable by a computer regardless of a reading method such as an electronic reading method, a magnetic reading method, or an optical reading method.

The entire disclosure of Japanese Patent Application Nos: 2005-104978, filed Mar. 31, 2005 and 2005-364433, filed Dec. 19, 2005 are expressly incorporated by reference herein.

What is claimed is:

1. A print job distributing and holding system capable of distributing and holding, in a printing system in which plural printers for executing print processing on the basis of plural print jobs are connected via a network, the plural print jobs corresponding to the respective printers in the plural printers, wherein the print job distributing and holding system connects plural print job holding apparatuses corresponding to the plural printers, respectively, via the network to be capable of performing data communication with one another, and each of the print job holding apparatuses includes:

a print job holding unit that holds a print job sent to the print job holding apparatus via the network;

a data control unit that detects a data size of the print job sent to the print job holding apparatus, that compares the data size of the print job with a remaining storage capacity of a data storing unit of the print job holding apparatus, and that determines whether a predetermined condition is satisfied, the predetermined condition being based on whether the storage capacity of the data storing unit is insufficient for the data size of the print job;

a print job holding entrusting unit that entrusts, when the predetermined condition is satisfied, another print job holding apparatus with holding of the print job sent to the print job holding apparatus via the network, the print job holding entrusting unit receiving operation state information from the another print job holding apparatus and evaluating operation states of the another print job holding apparatus based on a responsiveness of the another print job holding apparatus, a remaining storage capacity of the another print job holding apparatus, and a normality or abnormality of the another print job holding apparatus;

a print job substitute holding unit that holds a print job, holding of which is entrusted by another print job holding apparatus, in association with information on the another print job holding apparatus that entrusts holding of the print job;

an entrusted print job transmitting unit that transmits, in response to an acquisition request for the print job from the another print job holding apparatus, a print job held by the print job holding apparatus corresponding to the acquisition request to the another print job holding apparatus that requests acquisition of the print job;

an acquisition request transmitting unit that transmits an acquisition request for the print job, holding of which is entrusted to the another print job holding apparatus, to the another print job holding apparatus; and a print job transmitting unit that transmits a print job corresponding to a print instruction given to a printer corresponding to the print job holding apparatus to the printer.

2. A printing system in which plural printers that execute print processing on the basis of a print job are connected via a network, wherein plural print job holding apparatuses corresponding to the plural printers, respectively, are connected via the network to be capable of performing data communication with one another, and each of the print job holding apparatuses includes:

a print job holding unit that holds a print job sent to the print job holding apparatus via the network;

a data control unit that detects a data size of the print job sent to the print job holding apparatus, that compares the data size of the print job with a remaining storage capacity of a data storing unit of the print job holding apparatus, and that determines whether a predetermined condition is satisfied, the predetermined condition being based on whether the storage capacity of the data storing unit is insufficient for the data size of the print job;

a print job holding entrusting unit that entrusts, when the predetermined condition is satisfied, another print job holding apparatus with holding of the print job sent to the print job holding apparatus via the network, the print job holding entrusting unit receiving operation state information from the another print job holding apparatus and evaluating operation states of the another print job holding apparatus based on a responsiveness of the another print job holding apparatus, a remaining storage capacity of the another print job holding apparatus, and a normality or abnormality of the another print job holding apparatus;

a print job substitute holding unit that holds a print job, holding of which is entrusted by another print job holding apparatus, in association with information on the another print job holding apparatus that entrusts holding of the print job;

an entrusted print job transmitting unit that transmits, in response to an acquisition request for the print job from the another print job holding apparatus, a print job held by the print job holding apparatus corresponding to the acquisition request to the another print job holding apparatus that requests acquisition of the print job;

an acquisition request transmitting unit that transmits an acquisition request for the print job, holding of which is entrusted to the another print job holding apparatus, to the another print job holding apparatus; and a print job transmitting unit that transmits a print job corresponding to a print instruction given to a printer corresponding to the print job holding apparatus to the printer. The printer executes the print processing on the basis of the print job transmitted from the print job holding apparatus, whereby the printer executes the print processing on the basis of a print job transmitted from the print job holding apparatus.

3. The printing system according to claim 2, wherein the print job holding entrusting unit performs processing for entrusting the another print job holding apparatus with holding of the print job by transmitting entrustment request information including information on the print job holding apparatus that entrusts holding of the print job and information on an entrustment instruction to the another print job holding apparatus.

4. The printing system according to claim 3, where, when there are plural other print job holding apparatuses, the print job holding entrusting unit selects a print job holding apparatus entrusted with holding of the print job out of the plural other print job holding apparatuses on the basis of information on the plural other print job holding apparatuses and transmits the entrustment request information to the print job holding apparatus selected.

5. The printing system according to claim 2, wherein the print job holding apparatus acquires, when a free space capable of holding the print job, holding of which is entrusted to the another print job holding apparatus, is formed in the holding capacity, the print job from the another print job holding apparatus, in which the print job is stored, using the acquisition request transmitting unit.

6. The printing system according to claim 2, wherein the print job holding apparatus includes:

a connection state monitoring unit that periodically monitors, concerning a print job, holding of which is entrusted to the print job holding apparatus by the another print job holding apparatus and which is held in the print job holding apparatus, whether the another print job holding apparatus that entrusts holding of the print job is connected to the network; and a print job deleting unit that deletes, when it is judged by the connection state monitoring unit that the another print job holding apparatus that entrusts holding of the print job is not connected for a predetermined period, the print job, holding of which is entrusted to the print job holding apparatus by the another print job holding apparatus and which is held in the print job holding apparatus.

7. The printing system according to claim 2, wherein the print job holding apparatus includes:

an operation state information acquisition request transmitting unit that transmits an acquisition request for operation state information indicating an operation state of the another print job holding apparatus to the another print job holding apparatus; and an operation state information transmitting unit that transmits, in response to an acquisition request for operation state information from the another print job holding apparatus, operation state information of the print job holding apparatus to the another print job holding apparatus that requests acquisition of the operation state information, and the print job holding entrusting unit determines a print job holding apparatus entrusted with holding of the print job on the basis of the operation state information.

8. The printing system according to claim 7, wherein the operation state information includes at least one of information concerning safety of data holding in the print job holding apparatus and information concerning safety of data communication in the print job holding apparatus.

9. The printing system according to claim 2, wherein the print job holding entrusting unit divides a print job, holding of which is entrusted to the another print job holding apparatus, into three or more print job sections such that the print job can be restored from two or more print job sections and causes three or more separate print job holding apparatuses to hold the three or more print job sections, respectively, the acquisition request transmitting unit transmits an acquisition request for the print job to two or more print job holding apparatuses among the three or more print job holding apparatuses that hold the print job sections, and the print job holding apparatus includes a print job restoring unit that restores the original print job from the two or more print job sections acquired from the other print job holding apparatuses.

10. A printing system in which plural printers are connected via a network to be capable of performing data communication with one another, wherein each of the printers includes:

a print job holding unit that holds a print job sent to the printer via the network;

a data control unit that detects a data size of the print job sent to the printer, that compares the data size of the print job with a remaining storage capacity of a data storing unit of the printer, and that determines whether a predetermined condition is satisfied, the predetermined condition being based on whether the storage capacity of the data storing unit is insufficient for the data size of the print job;

a print job holding entrusting unit that entrusts, when the predetermined condition is satisfied, another printer with holding of the print job sent to the printer via the network, the print job holding entrusting unit receiving operation state information from the another printer and evaluating operation states of the another printer based on a responsiveness of the another printer, a remaining storage capacity of the another printer, and a normality or abnormality of the another printer;

a print job substitute holding unit that holds a print job, holding of which is entrusted by another printer, in association with information on the another printer that entrusts holding of the print job;

an entrusted print job transmitting unit that transmits, in response to an acquisition request for the print job from the another printer, a print job held by the printer corresponding to the acquisition request to the another printer that requests acquisition of the print job;

an acquisition request transmitting unit that transmits an acquisition request for the print job, holding of which is entrusted to the another printer, to the another printer; and a print processing unit that performs print processing on the basis of the print job.

11. The printing system according to claim 10, wherein the print job holding entrusting unit performs processing for entrusting the another printer with holding of the print job by transmitting entrustment request information including information on the printer that entrusts holding of the print job and information on an entrustment instruction to the another printer.

12. The printing system according to claim 11, wherein, when there are plural other printers, the print job holding entrusting unit selects a printer entrusted with holding of the print job out of the plural other printers on the basis of information on the plural other printers and transmits the entrustment request information to the printer selected.

13. The printing system according to claim 12, wherein the predetermined condition is satisfied when the printer cannot hold the print job sent to the printer via the network.

14. The printing system according to claim 13, wherein the printer acquires, when a free space capable of holding the print job, holding of which is entrusted to the another printer, is formed in the holding capacity, the print job from the another printer, in which the print job is stored, using the acquisition request transmitting unit.

15. The printing system according to claim 10, wherein the printer includes:
- a connection state monitoring unit that periodically monitors, concerning a print job, holding of which is entrusted to the printer by the another printer and which is held in the printer, whether the another printer that entrusts holding of the print job is connected to the network; and
- a print job deleting unit that deletes, when it is judged by the connection state monitoring unit that the another printer that entrusts holding of the print job is not connected for a predetermined period, the print job, holding of which is entrusted to the printer by the another printer and which is held in the printer.

16. The printing system according to claim 10, wherein the printer includes:
- an operation state information acquisition request transmitting unit that transmits an acquisition request for operation state information indicating an operation state of the another printer to the another printer; and
- an operation state information transmitting unit that transmits, in response to an acquisition request for operation state information from the another printer, operation state information of the printer to the another printer that requests acquisition of the operation state information, and
- the print job holding entrusting unit determines a printer entrusted with holding of the print job on the basis of the operation state information.

17. The printing system according to claim 16, wherein the operation state information includes at least one of information concerning safety of data holding in the printer and information concerning safety of data communication in the printer.

18. The printing system according to claim 16, wherein
- numerical values indicating effectiveness are set for each type of the respective pieces of information of the operation state information in advance, and
- the print job holding entrusting unit determines a printer having a highest total value of the numerical values indicating effectiveness preferentially as a printer entrusted with holding of a print job.

19. The printing system according to claim 10, wherein
- the print job holding entrusting unit divides a print job, holding of which is entrusted to the another printer, into three or more print job sections such that the print job can be restored from two or more print job sections and causes three or more separate printers to hold the three or more print job sections, respectively,
- the acquisition request transmitting unit transmits an acquisition request for the print job to two or more printers among the three or more printers that hold the print job sections, and
- the printer includes a print job restoring unit that restores the original print job from the two or more print job sections acquired from the other printers.

* * * * *